INVENTOR.
RUFUS OLDENBURGER

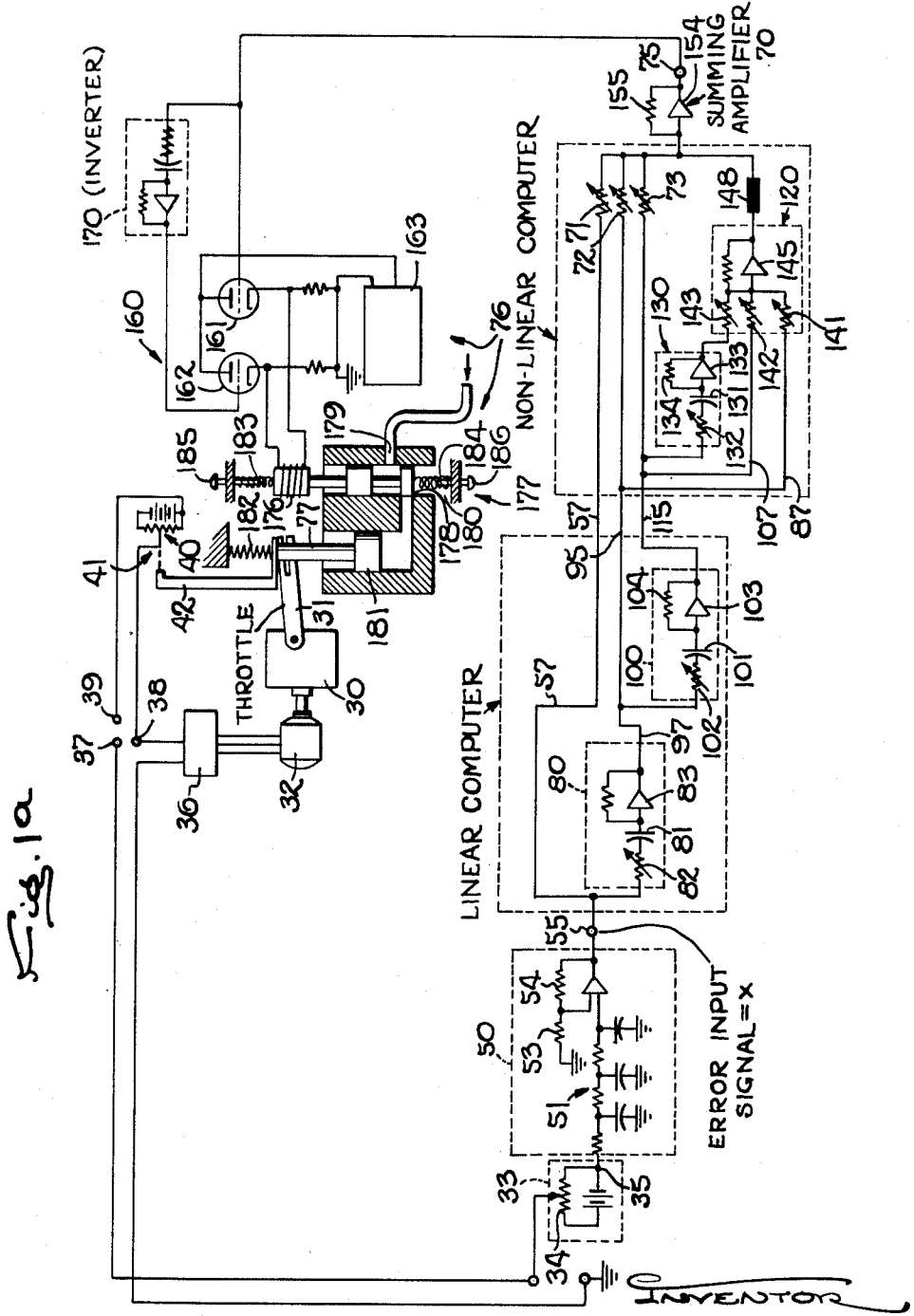

Dec. 29, 1964   R. OLDENBURGER   3,163,813
AUTOMATIC CONTROL SYSTEM
Filed Oct. 8, 1953                               11 Sheets-Sheet 3
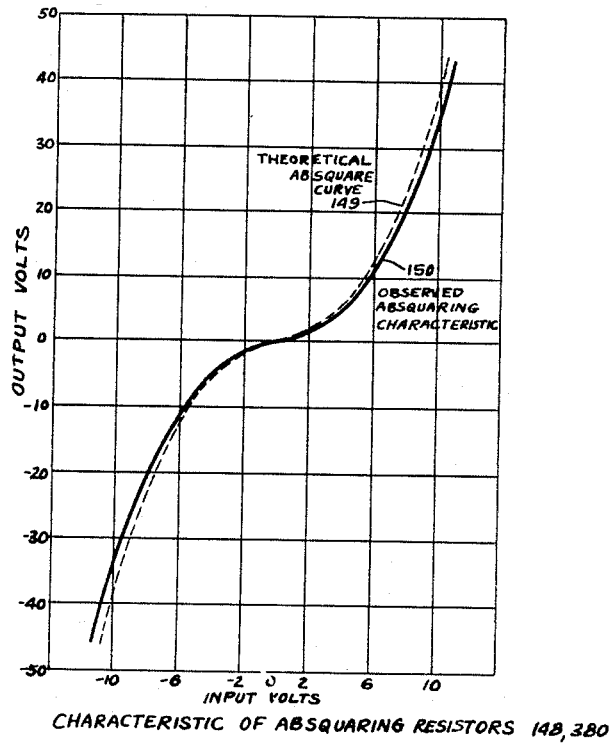
CHARACTERISTIC OF ABSQUARING RESISTORS 148, 380
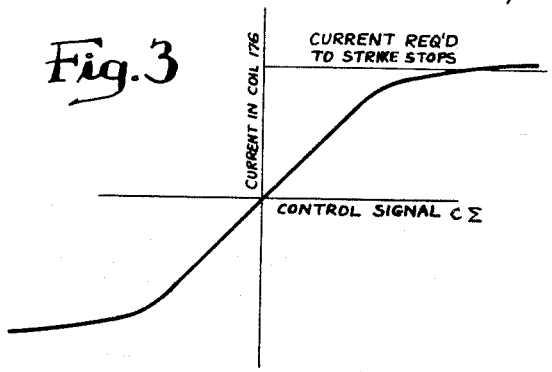
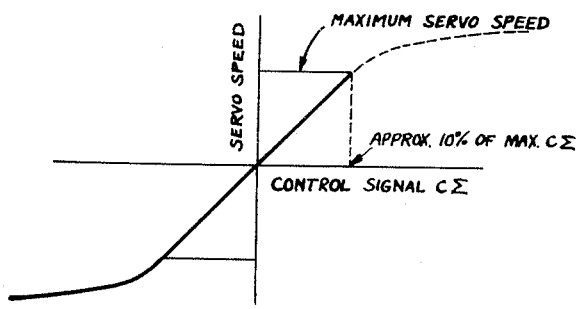
INVENTOR.
RUFUS OLDENBURGER
BY
Carlson, Pitzner, Hubbard + Wolfe
Attys.

Dec. 29, 1964  R. OLDENBURGER  3,163,813
AUTOMATIC CONTROL SYSTEM
Filed Oct. 8, 1953  11 Sheets-Sheet 4

GAIN CHANGER (INCREASE)

GAIN CHANGER (DECREASE)

INVENTOR.
RUFUS OLDENBURGER
BY Carlson, Pitzner, Hubbard + Wolfe
Attys.

INVENTOR.
RUFUS OLDENBURGER
BY
Carlson, Pitzner, Hubbard + Wolfe
Attys.

INVENTOR.
RUFUS OLDENBURGER
BY
Carlson, Pitzner, Hubbard & Wolfe
Attys.

Dec. 29, 1964  R. OLDENBURGER  3,163,813
AUTOMATIC CONTROL SYSTEM
Filed Oct. 8, 1953  11 Sheets-Sheet 7

TRANSIENT RESPONSE

INVENTOR.
RUFUS OLDENBURGER
BY
Carlson, Pitzner, Hubbard + Wolfe
attys.

Dec. 29, 1964   R. OLDENBURGER   3,163,813
AUTOMATIC CONTROL SYSTEM
Filed Oct. 8, 1953   11 Sheets-Sheet 8
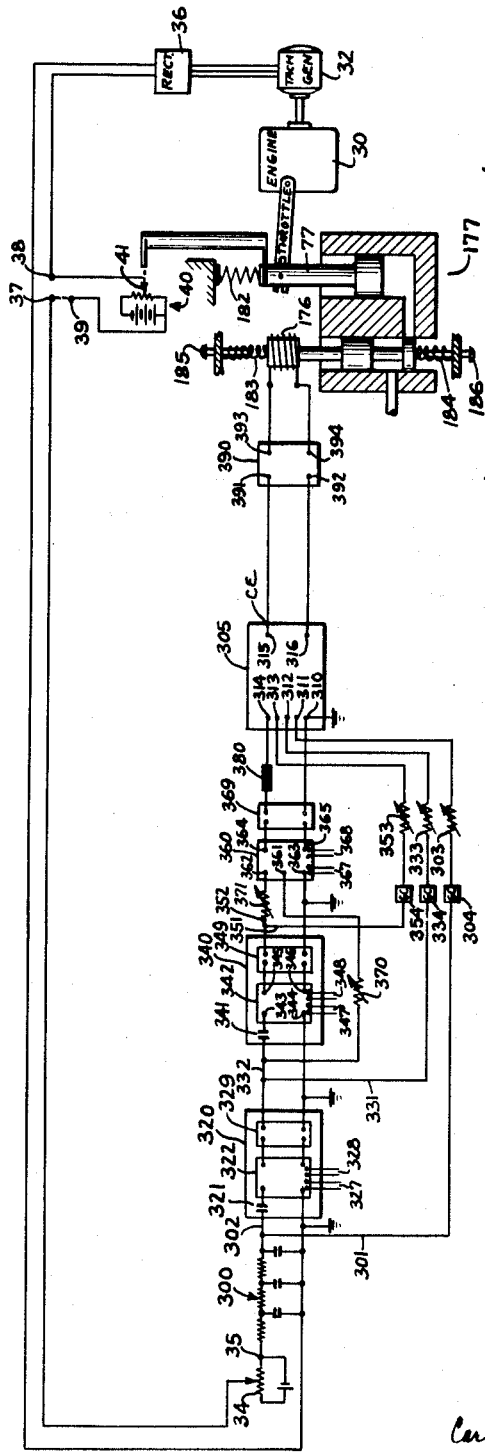
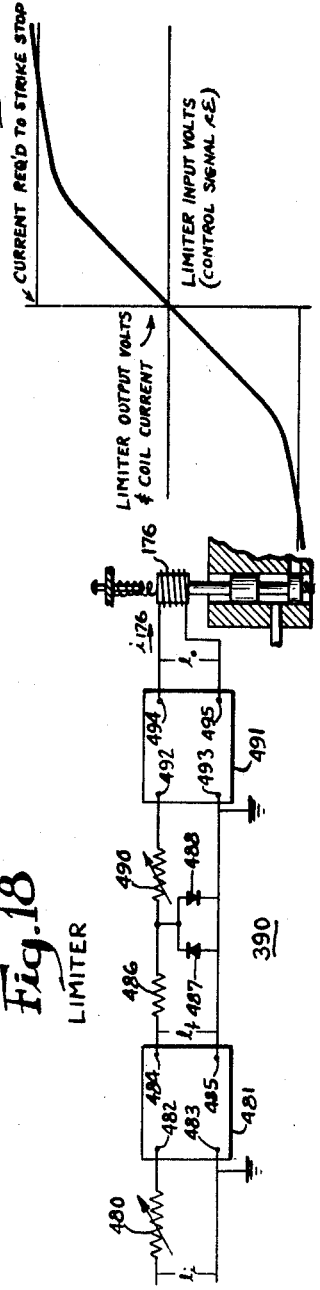
INVENTOR.
RUFUS OLDENBURGER
BY
Carlson, Pitzner, Hubbard + Wolfe
Attys.

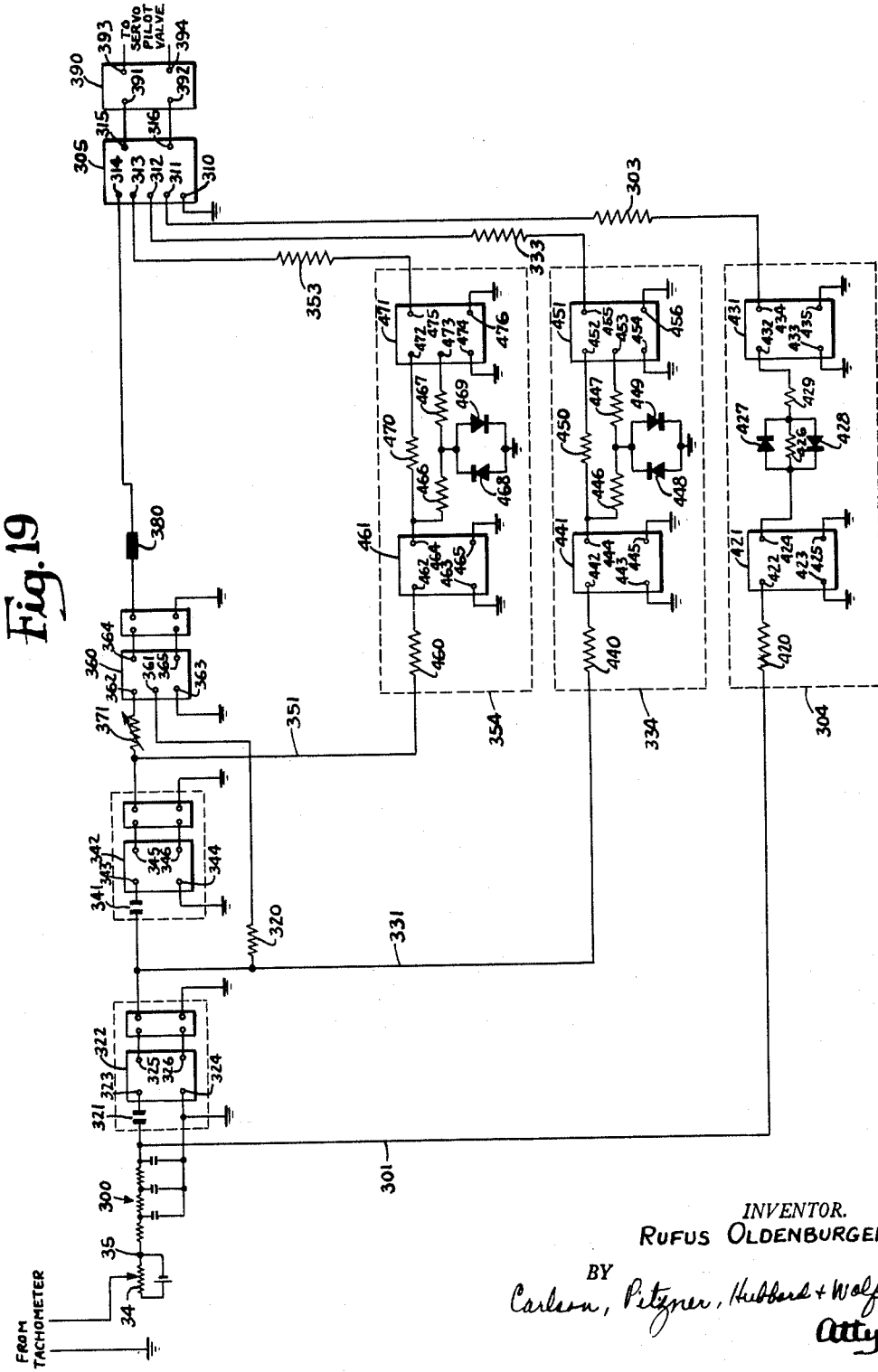

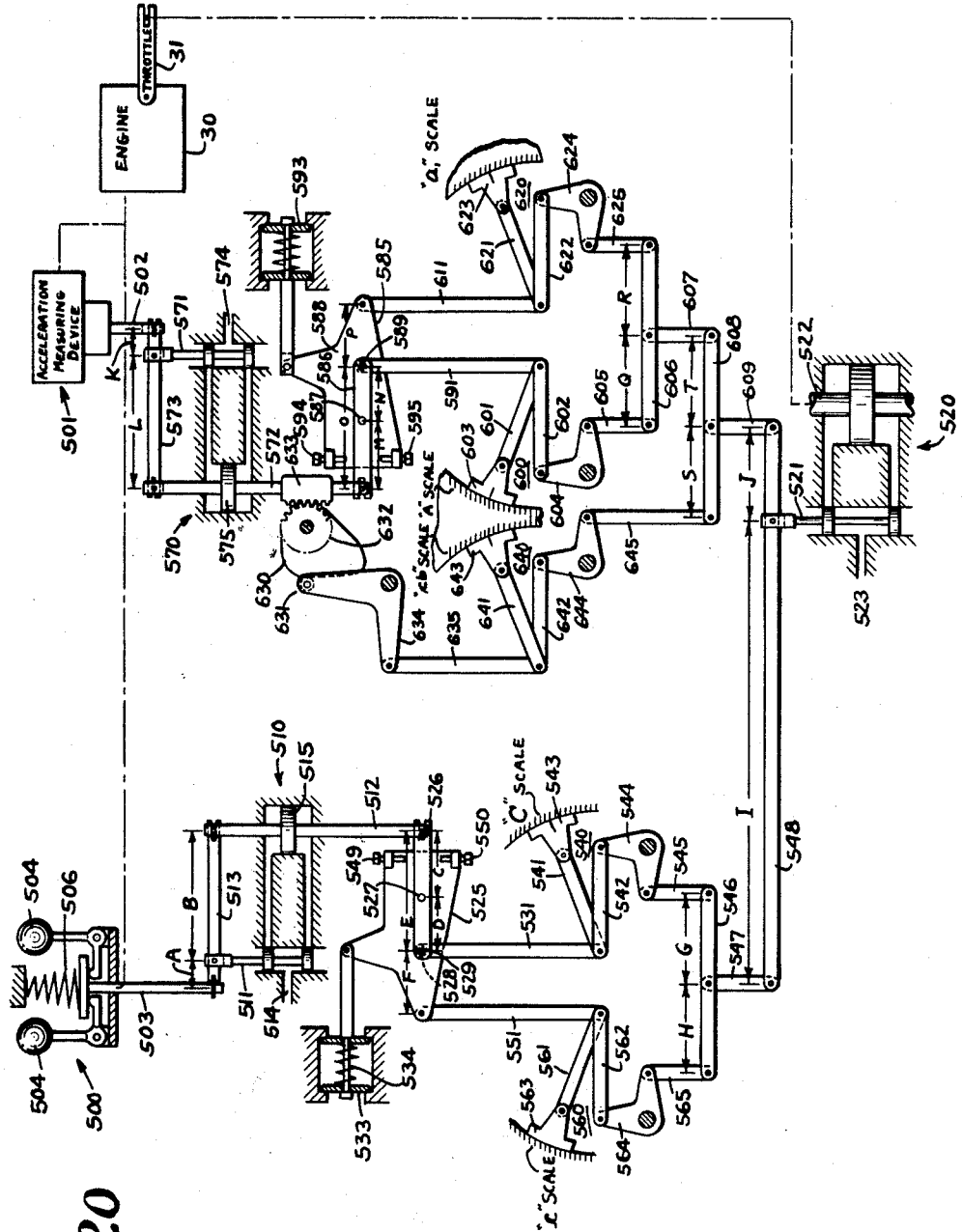

Dec. 29, 1964 R. OLDENBURGER 3,163,813
AUTOMATIC CONTROL SYSTEM
Filed Oct. 8, 1953 11 Sheets-Sheet 11
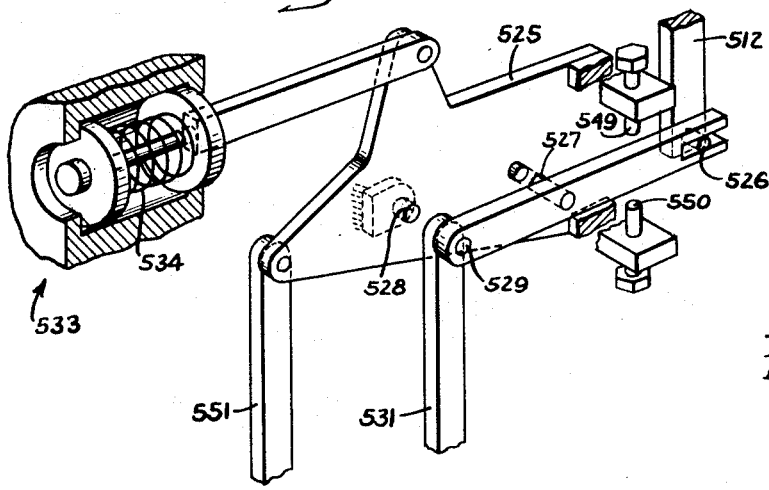
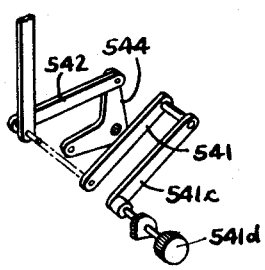
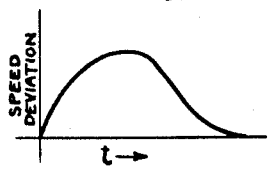
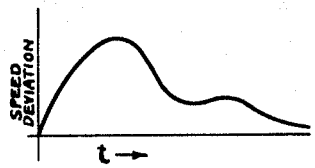
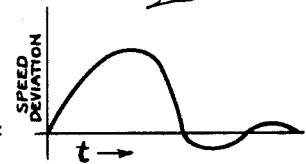
INVENTOR.
RUFUS OLDENBURGER
BY
Carlson, Pitzner, Hubbard + Wolfe
Attys.

3,163,813
AUTOMATIC CONTROL SYSTEM
Rufus Oldenburger, Rockford, Ill., assignor to Woodward Governor Company, Rockford, Ill., a corporation of Illinois
Filed Oct. 8, 1953, Ser. No. 384,957
38 Claims. (Cl. 318—448)

*Index to Patent Specification*

| | Column |
|---|---|
| Electronic Nonlinear Governor | 4 |
| Procedure for Adjusting Electronic Nonlinear Governor | 8 |
| Preliminary Adjustment for Linear Control | 9 |
| Adjustment of Nonlinear Channel | 11 |
| Use of Gain Changers | 12 |
| Electronic Governor—Second Embodiment | 16 |
| Electronic Governor—Third Embodiment | 18 |
| Electronic Governor—Fourth Embodiment | 19 |
| Electronic Governor—Fifth Embodiment | 20 |
| Electromagnetic Nonlinear Governor | 21 |
| Magnetic Amplifier Circuit | 23 |
| Procedure for Adjusting Electromagnetic Governor | 24 |
| Use of Gain Changers in Electromagnetic Governor | 26 |
| Procedure for Adjusting the Electromagnetic Governor Having Integral Gain Changers | 27 |
| Setting the Circuit Constants in the Deviation Channel | 29 |
| Setting the Circuit Constants in First Derivative Channel | 30 |
| Setting the Circuit Constants in Second Derivative Channel | 30 |
| Limiter Used in Electromagnetic Governor | 31 |
| Mechanical Nonlinear Governor | 32 |
| Multiplying Device | 34 |
| Adjustment of Mechanical Nonlinear Governor | 35 |

The present invention relates to automatic control systems and more particularly to improved means for controlling a variable condition, notably the speed of prime movers and other rotating devices.

While the present devices are particularly suited for the governing of speed, and while the various embodiments of the invention have been described with emphasis upon speed control, it will be understood that the invention is not limited thereto and a number of the concepts and features which are disclosed are applicable in the controlling of other variables such as position, temperature and pressure, to name but a few. For this reason terminology has been used which is applicable to automatic control systems in general and which corresponds to that set forth in "Automatic Control Terminology," Paper 52-SA-29 published by the American Society of Mechanical Engineers in 1952.

By definition, an automatic controller is a device which measures the value of a variable quantity or condition and which operates to restore the condition to a desired reference value. Thus, where it is desired to control the speed of a prime mover in spite of changes in loading, means are provided, in the form of a tachometer or the like, for measuring the speed. The speed measurement is fed into a controlling means, the output of which is applied to a motor operator having a final control element. The latter correctively moves a throttle so that the desired speed is restored. Various factors tend to complicate this simple problem and much work has been done over the years to improve the "transient response," in other words to restore the condition to its desired value as quickly as possible and with a minimum of overswing or cycling about the desired control point.

The present device constitutes a departure in speed governing techniques in a number of respects which will become apparent as the discussion proceeds. The invention resides in a new combination of elements which cooperate to produce more precise control with greater rapidity of response than was possible using prior art arrangements. One of the elements in the combination is an "absquarer" which, in accordance with the present invention, acts upon a signal representative of the rate of change of the controlled variable, i.e., speed, to produce at its output an "absquare" component which is combined with deviation and rate components to drive a servo device which, in turn, correctively adjusts the speed. The absquare concept is novel, having no counterpart in the governor field, and it was necessary to coin a term to describe it.

As used in the present application, the "absquare" of the first derivative of the deviation is the product of the first derivative multiplied by its absolute value. In order to obtain the absquare signal I prefer to use non-linear resistive materials having a parabolic characteristic and of the type well known in the art as "thyrite." It will, however, be understood that such material only approximately follows the absquare characteristic defined above. Consequently, when the term absquare is used, it shall be understood to include close practical approximations of the absquare. Furthermore, it is desirable under some circumstances to feed into the absquaring device not only a first derivative signal, but also derivative signals of higher order.

Use of the absquare signal is distinguished by full speed of the motor operator for all but small disturbances. The effect is to produce more rapid speed correction than is possible using conventional techniques, since the rate of correction is limited almost entirely by the power capability of the output motor operator or servo device. By way of example, it may be assumed that the speed-controlled device, such as a prime mover, suffers a change in speed as a result of a sudden imposition or dropping of the load. Using the present arrangement, the throttle adjusting motor will rotate at full speed in the corrective direction followed by a switch to full speed in the opposite direction to reestablish equilibrium with extreme promptness and without overswing. Using the present arrangement there may, in fact, be more than one such "switch point" depending upon the number of lags in the system.

For many speed control applications, it is sufficient to provide means for deriving the absquare of the first derivative only. My invention is not, however, limited to this but includes means for deriving the absquare of the sum of the first derivative and second derivative functions.

In accordance with one of the aspects of the invention component signals are derived in separate channels, and means are provided in such separate channels for changing the gain of the channel in accordance with the signal carried thereby to provide for transition between two different modes of operation, i.e., linear and non-linear.

While the invention may be embodied in an electronic governor, it is by no means limited thereto but may be embodied with equal advantage in speed governors of other types, for example, magnetic or mechanical.

It is accordingly an object of the present invention to provide an improved automatic controller which is capable of extremely rapid response with a minimum of overswing and without objectionable cycling about the control point. It is a related object to provide a controller in which the final control element is correctively moved at high speed, and in which the maximum available power of the corrective means is utilized to effect the necessary correction.

It is another object to provide a controller which is capable of controlling systems having a high degree of lag or dead time and which is particularly suited to controlling the speed of a prime mover.

It is a further object to provide an improved automatic controller in which a nonlinear control channel is employed for providing maximum speed of response in the case of large departures but in which the effectiveness of the nonlinear channel is subordinated in the region of the control point.

More specifically, it is an object to provide an automatic controller having novel means for transferring from nonlinear control to linear control upon approaching the control point from either direction.

It is still another object, related to the foregoing, to provide an automatic controller having a number of channels for producing signal components which are added together to form a net control signal and in which the gains of the respective channels are changed in accordance with the magnitude of the signal therein.

It is an object to provide a scheme of automatic control which is extremely flexible in application and which may be embodied in various types of control devices exemplified by the electronic, electromagnetic, and mechanical devices which are described herein. It is a further object to provide a system of control which may be used with systems having a wide range of such operating characteristics as lag, gain, power and speed.

It is, moreover, an object of the invention to provide an automatic control system which not only has an improved transient response but which is inherently simple and straightforward, as well as economical, in first cost and in maintenance, using noncritical components and requiring no critical adjustments.

Other objects and advantages of the invention will be apparent upon reading the specification and upon reference to the attached drawings, in which:

FIGURE 1 discloses, partially schematically, a nonlinear electronic speed controller constructed in accordance with the present invention.

FIG. 2 shows the characteristic of the absquaring element employed in FIG. 1.

FIG. 3 shows the variation in servo current as a function of the net control signal.

FIG. 3a shows the variation in servo speed as a function of the net control signal.

Figure 1:
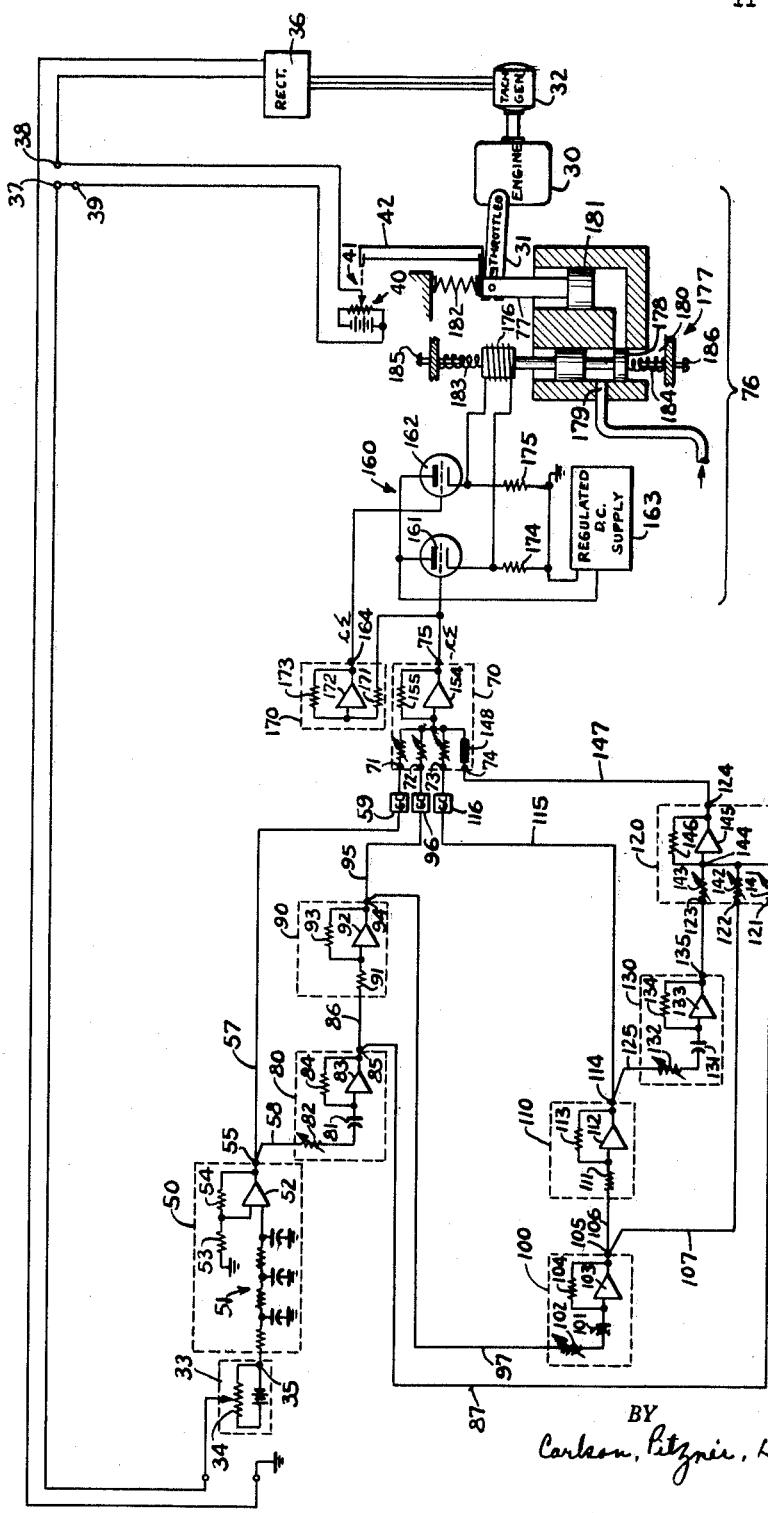
FIG. 1a is similar to FIG. 1, and illustrates the same controller, with the various components rearranged spatially to indicate the presence of linear and non-linear computers formed thereby.

FIGS. 8–11, inclusive, disclose control systems employing the teachings of FIG. 1, but simplified for use in applications where refined control is not essential.

Figure 12:
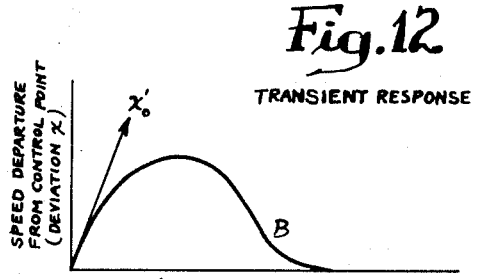

FIG. 12 is a transient speed curve obtained using the nonlinear control system of FIG. 1.

FIG. 13 discloses, partially schematically, a nonlinear electromagnetic speed controller constructed in accordance with the present invention.

Figure 14:
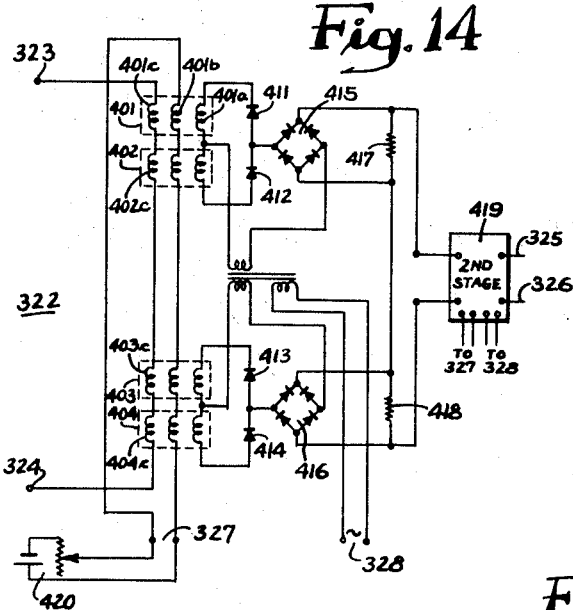

FIG. 14 discloses a magnetic amplifier circuit of the type employed in FIG. 13.

Figure 15:
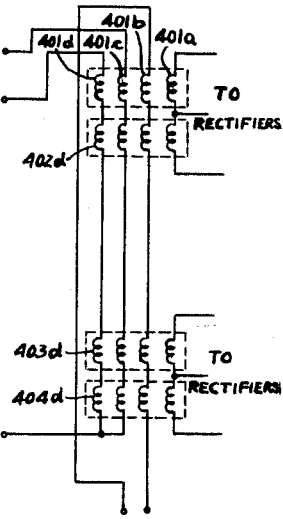
Figure 16:
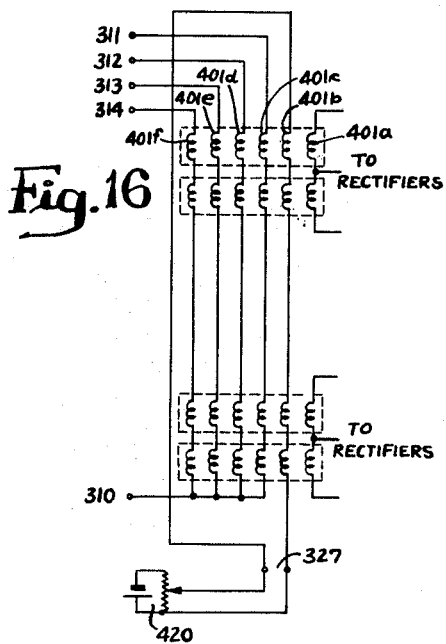

FIGS. 15 and 16 show modified input circuits for use with the magnetic amplifier of FIG. 14.

Figure 17:
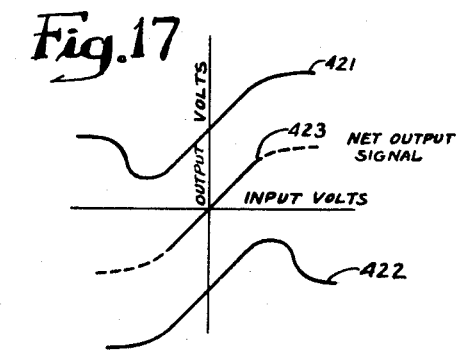

FIG. 17 shows the output characteristic of the magnetic amplifier of FIG. 14.

FIG. 18 shows a limiter circuit for use in the control system of FIG. 13.

FIG. 18a shows the variation in servo current as a function of the net control signal when using the limiter of FIG. 18.

FIG. 19 discloses a modified form of the system shown in FIG. 13, including provision for changing gain in the respective channels.

FIG. 20 discloses, partially schematically, a non linear mechanical speed controller constructed in accordance with the present invention.

FIG. 21 is a fragmentary perspective of the gain-changing mechanism employed in FIG. 20.

FIG. 22 is a geometric construction showing the operation of the multipliers used in FIG. 20.

FIG. 23 is a fragmentary perspective showing an alternate mechanism for manually adjusting the multipiers.

FIGS. 24–26, inclusive, show transcient speed characteristic applicable to FIG. 20 for respective conditions of adjustment.

ELECTRONIC NONLINEAR GOVERNOR

Referring now to the drawings, FIGURE 1 shows schematically one form of the present invention. The arrangement shown in this figure is intended for use with controlled devices, for example, internal combustion engines, which exhibit substantial lags and dead time, and in particular systems in which the summation of the lags and dead time is approximately ⅕ second or more. In the sections which follow, the invention is embodied in somewhat simpler system for use where the number of large lags and dead times is not excessive, or where precise control is not essential, or where low amplitude cycling about the control point may be tolerated.

The automatic controller of FIGURE 1 is used for governing engine speed, the engine being indicated diagrammatically at 30. The engine speed is controlled by a throttle 31 and means are provided for continuously measuring the engine speed. In the present instance this measuring device includes a tachometer generator 32 and a source of auxiliary voltage 33 which is settable by a control 34. The circuit is so arranged that the output voltage of the tachometer generator is in series with voltage source 33, with the polarities in bucking relation, so that the net voltage appearing at output terminal 35 has direction and magnitude which correspond to the direction and magnitude of the departure in speed. The tachometer may be of the D.-C. or A.-C. type; in the latter event the output is rectified by a rectifier 36 as shown.

Where straight "isochronous" control is desired, the rectified tachometer voltage is simply bucked against the adjustable voltage from the source 33, the circuit being completed by interconnecting terminals 37–38. However, where it is desired to provide "droop," as for example, where a number of engines are operated in parallel with one another, a source of droop voltage 40 is provided having a control 41 which is directly coupled to the throttle of the engine by means of a mechanical link 42. Such voltage is added in series by transferring the connection from terminals 37–38 to 37–39.

The net voltage at the terminal 35 forms the basic deviation signal which, as an initial step, is passed through a filter 50. This filter is so constructed as to remove the electrical "noise" which accompanies the signal. The term "noise" is a general one and refers to any extraneous high frequency components in the control signal. In an engine, noise results primarily from the fact that power is obtained from separate explosions and from impact of the individual gear teeth where gears are used. The filter includes an RC network 51 and an operational amplifier 52 having associated resistors 53, 54 and feeding an output terminal 55.

During the course of discussion frequent reference will be made to operational amplifiers, indicated in each case by the conventional triangular symbol. It will be understood that such amplifiers are standard units of the type used in analog computing apparatus, such, for example, as described at page 152 in Electronic Analog Computers, by Korn and Korn, McGraw-Hill, 1952, and which are commercially manufactured by George A. Philbrick Researches, Inc., of Boston, Massachusetts. Reference is made to the descriptive literature covering the Model K2–W amplifier for operating characteristics. A high value of feedback insures linearity; for practical purposes the gain of a given stage in the ratio of the amplifier shunt or feedback impedance to the series or input impedance and is independent of minor variations in tube characteristics.

The output of the amplifier unit 52 is applied to two lines 57, 58. In the first, the deviation signal is utilized directly; in the second it is differentiated for forming derivatives. From the line 57 the signal passes through a gain changer 59 which wil be described in a subsequent section. The output terminal of the gain changer is connected to the first input terminal of a signal adder 70 having input terminals 71–74 and an output terminal 75. The purpose of the signal adder is to add together the error signal and its derived components to form a net control signal at the output terminal 75. This net signal is then used to control a "motor operator" indicated generally at 76, which includes a final control element 77 connected to the throttle 31. The motor operator will be discussed at a later point.

Referring back to the line 58 at the output of the filter 50, a first differentiator unit 80 is provided having a differentiating capacitor 81, an input resistor 82, an amplifier 83 and a feed-back resistor 84. The differentiator unit acts to differentiate the input signal, i.e., to take the first derivative with respect to time. The output or derivative signal is applied to an output terminal 85 and is fed to two lines 86, 87. The first line 86 carries the directly utilized signal which is fed to the terminal 72 of the signal adder 70 via an inverter 90 and a gain changer 96. The inverter is simply an amplifier unit having a gain of unity used to restore proper sign and includes an input resistor 91, an operational amplifier 92 and a feedback resistor 93. The signal arriving at the terminal 72, because of the differentiation which has occurred in the unit 80, is proportionate to the first derivative of the speed deviation.

In order to obtain a second derivative signal, a second differentiator unit 100 is used having a differentiating capacitor 101, an input resistor 102, an amplifier 103 and feed-back resistor 104. The second derivative signal, appearing at output terminal 105, is fed to two lines 106, 107. Because of the reversal of sign occurring in the differentiator, it is necessary to use an inverter 110 in the line 106, the inverter having an input resistor 111, an amplifier 112 and a feed-back resistor 113. The output terminal 114 of the inverter is connected to the third input terminal 73 of the signal adder 70 via a line 115 and a gain changer 116 as shown.

In accordance with the present invention, novel means are provided for producing a control signal which not only includes the error signal and derivatives thereof but which also includes an auxiliary control signal which is an absquare function of the sum of the first and higher order derivative signals. The term "absquare" is a coined term. It is the same as the square function in magnitude but differs from the square function in the respect that it preserves the sign of the quantity acted upon. Thus, if the quantity acted upon were, say, minus 2, the absquare of the quantity would be minus 4. If the quantity acted upon were a plus 2, the absquare would be plus 4. In considering the formation of the absquare signal, attention will first be directed toward means for producing the derivative signal which is acted upon by the absquaring circuit. The term "derivative signal" as used herein, unless otherwise qualified, shall be understood to be a signal consisting of one or more derivative functions of the error signal.

In the present instance the components of the derivative signal used for absquaring are added together by a derivative adder 120 having input terminals 121, 122, 123, and an output terminal 124. As to the first derivative, this is supplied from the differentiator 80 via the line 87. The second derivative signal is obtained from the output of the second differentiator 100, and is supplied to the derivative adder by the line 107. To obtain a third derivative signal, the output of the inverter 110 is fed via a line 125 to a third differentiator unit 130 having a differentiating capacitor 131, an input resistor 132, an amplifier 133 and feed-back resistor 134. The output terminal 135 of the third differentiator unit is connected to the input terminal 123 of the derivative adder.

In the derivative adder 120 a resistor network is provided consisting of resistors 141, 142, and 143. These resistors have a common output terminal 144 feeding into an amplifier 145 having a feed-back resistor 146. Thus, the derivative signal which exists at the output terminal 124 of the derivative adder is proportional to the sum of the first to third derivative signals with their respective constants.

In carrying out the present invention, the derivative signal is fed into an absquaring device 148, which forms a part of the signal adder 70. The signal adder 70 may thus be more properly referred to as an "adder-absquarer." In accordance with one of the features of the invention, the absquaring device 148 is in the form of a nonlinear resistor element in which the current varies as the square of the applied voltage. The theoretical absquare curve is set forth at 149 in FIG. 2.

The selection of a resistor material having the desired absquaring characteristic is a problem which is well within the scope of one skilled in this art. A number of nonlinear resistor materials are available on the market which exhibit the desired characteristic in varying degrees. The material known as thyrite has been found to be particularly suitable, the characteristic of thyrite (Type V–3,900,-353 sold by the General Electric Company) being set forth at 150 in FIG. 2. It will be understood, however, that the invention is not limited to the use of this material but would include the use of any other materials or devices exhibiting the same general input-output characteristic.

The output signal of the absquaring device 148 is added to voltages derived from the resistors 151–153 which carry the deviation signal and first and second derivative signals respectively. Such resistors are preferably variable to enable the signal components to be varied with respect to one another. The net signal is fed into an amplifier 154 having a feed-back resistor 155 to produce a net output signal at the terminal 75 which will be referred to in subsequent analysis as $-c\Sigma$, where $\Sigma$ is a control function and $c$ the gain constant of the circuit.

Attention may next be given to the motor operator 76 which converts the signal from the control unit into mechanical movement of the throttle. The first part of the motor operator is a cathode follower stage 160 having vacuum tubes 161, 162, and supplied by a regulated D.-C. power supply 163. In order to produce on output signal which is proportional to the signal at the terminal 75 in direction as well as magnitude, the signal fed to the tube 162 is inverted in phase by an inverter 170 having an input resistor 171, an amplifier 172 and a feed-back resistor 173. The inverter has a gain of one, hence the signal at the output terminal 164 of the inverter is simply $+c\Sigma$. In operation one tube conducts more and the other less, depending upon the polarity of the voltage, causing corresponding voltage increase and drops in the cathode resistors 174, 175.

Connected across the cathodes of tubes 161, 162 is a control winding 176 of an hydraulic servo device 177. The servo has a pilot valve 178 which cooperates with a supply port 179 and a sump 180, to control the flow of fluid to a servo cylinder having a piston 181. The piston 181 is connected to the final control element 77, which in turn operates the engine throttle. Return movement of the throttle is obtained by providing a return spring 182.

The pilot valve in the present device is provided with entering springs 183, 184 as well as stops 185, 186, which prevent the pilot valve from moving substantially beyond its "full on" or "full off" condition. Hammering of the stops, is, however, minimized by limiting the current which is supplied to the winding 176, the current versus control signal characteristic being set forth in FIG. 3. It will be noted in this figure that limiting occurs below the value of current required for the pilot valve to strike its stops. Such limiting is accomplished by utilizing the effect of current saturation in the tubes 161, 162. The point of saturation depends upon the tube characteristics, circuit resistances and operating voltages, and is a matter which is well within the capability of one skilled in the art.

In practicing the present invention, it is desirable to employ a servo in which the speed of response of the output under "full on, full off" conditions is as high as possible. In a practical case, the speed of the servo piston is limited by the allowable size of the servo device and the pressure and rate of flow of the fluid which is available to operate it. In general, it is not desirable for the servo device to consume more than a fraction of a percent of the maximum power of the engine which it controls. As a practical matter, when controlling an average internal combustion engine, I prefer to use a servo having a maximum speed on the order of 5 to 10 or more inches per second, when subjected to normal frictional loading.

The servo device and its associated cathode follower stage include a number of design parameters which must be taken into consideration in working out a practical design. It will suffice to say that the overall characteristic of the motor operator 76 should follow the curve set forth in FIG. 3a of the drawings. Here it will be noted that the servo speed varies directly in proportion to the applied control signal $c\Sigma$ up to the point at which the maximum servo speed is attained. In carrying out the invention, I prefer that the motor operator be so designed that the maximum servo speed is attained with a control signal $c\Sigma$, which is only about 1/10 of the maximum control signal, the maximum control signal being defined as that which results upon making an extreme and abrupt change in the loading of the engine 30, for example by dropping full load. This insures that the servo will operate at its maximum speed of response in the face of almost all normally encountered disturbances, and excepting only those minor disturbances which occur in the vicinity of the control point under conditions of substantial equilibrium. In summary, it will be seen from FIGS. 3 and 3a that the motor operator or power means is linearly responsive to the net control signal $c\Sigma$ but saturates (i.e., does not increase its response) when that control signal exceeds a predetermined value. On the other hand, the net control signal $c\Sigma$ is continuously variable over a given range which substantially exceeds predetermined band of values to which the motor operator linearly responds. Thus, the motor operator will operate "full on" or "full off" during the correction period which follows a severe disturbance of equilibrium.

One skilled in the art might conclude from the foregoing that the operation of the control system as a whole would be extremely erratic, comparing such system with conventional linear systems in which the servo speed varies in accordance with the magnitude of the disturbance over almost the entire operating range and in which maximum servo speed is attained only under the most extreme conditions. It is found, however, that the absquaring function and the manner in which it is utilized in the present circuit produce a control function which is eminently suited to the high speed servo action, producing a transient response characteristic which is more favorable than that attained in highly developed control systems of more conventional types.

*Procedure for Adjusting Electronic Nonlinear Governor*

The arrangement described above and shown in FIG. 1 includes means for adjusting the various components of the control signal relative to one another. The significant variable elements may be summarized as follows:

| Resistor | In— | Controls Magnitude of— |
| --- | --- | --- |
| 53 | Filter 50 | Signal fed into controller as a whole. |
| 151 | Signal Adder 70 | Deviation signal. |
| 82 | First differentiator Unit 80 | All derivative signals. |
| 152 | Signal Adder 70 | First derivative signal. |
| 102 | Second differentiator Unit 100. | All second and higher derivative signals. |
| 153 | Signal Adder 70 | Second derivative signal. |
| 141 | Derivative Adder 120 | First derivative signal for absquarer. |
| 142 | ____do____ | Second derivative signal for absquarer. |
| 132 | Third differentiator Unit 130. | Third derivative signal for absquarer. |
| 143 | Derivative adder 120 | Do. |

In carrying out the present invention, the circuit shown in FIG. 1 is utilized for obtaining a control signal $-c\Sigma$, at output terminal 75, where $c\Sigma$ has the following form:

$$c\Sigma = cx + ca_1 x' + ca_2 x'' + cb \text{ absquare } [x' + a_1 x'' + a_2 x'''] \quad (1)$$

Here $\Sigma$ is a control function; $x$ is the speed deviation; $x'$, $x''$ and $x'''$ are first, second, and third derivatives of $x$; and $a_1$, $a_2$, $b$ and $c$ are constant coefficients. I have devised a novel procedure for adjusting the various resistors in terms of the coefficients $a_1$, $a_2$, $b$ and $c$. In this connection it can be shown that the above coefficients may be given physical significance in terms of the system which it is desired to control, as follows:

$a_1$=the sum of the time lags (including dead time), normally measured as time constants.

$a_2$=the sum of the products of the time lags taken two at a time.

$b$=the inverse of the product of twice the gain of the system and the maximum servo speed.

$c$=overall gain coefficient.

The only one of the above coefficients which cannot be immediately ascertained by tests on the system to be controlled is $c$; $a_1$, $a_2$ and $b$ being stated simply in terms of time lags, the gain of the system, and maximum servo speed. Attention may first be given to the procedure for determining the time lags in a practical case, for example, a gasoline engine, where three primary lags are usually present. The first is the throttle lag, that is to say, the time interval which occurs between making a step change in the throttle setting and the time that the new value of torque is applied. Since the new value of torque will be approached along an approximately exponential curve, the time lag can be considered to be the interval required for the torque to reach $(1-1c)$ of the new value, where $c$ is the base of natural logarithms.

Another lag in a gasoline engine is the interval between the time that a given change in torque results in a new value of speed, the delay being due to various factors, notably the inertia of the engine and connected load. Here again, as a close approximation, the time lag can be taken to be the time required for the speed to reach $(1-1c)$ of the new value. A third factor is the dead time due to the intermittent character of the explosions. Experience has shown that this dead time in a typical four-cycle engine is the period required to make one revolution and in the case of a two-cycle engine is the period required to make one-half a revolution. The first two lags are characteristic of the engine and do not vary substantially with speed. For maximum accuracy, however, all three lags should be determined at the design speed at which the engine will rotate during normal use in the particular application.

Having this ascertained $a_1$ and $a_2$, determination of $b$ requires knowledge of system "gain," which is defined as the initial value of the first derivative of the controlled variable (here, speed) provided by the displacement of the final control element (the throttle) when the step change is made in the final control element from equilibrium. The maximum servo speed is defined as the greatest speed of which the final control element is capable. In the present instance it may be measured by observing the speed of the element 77 with the pivot valve 177 open all of the way.

I have found that $c$ may be determined in a particular instance by a procedure which has as its first step adjusting the device for linear control with the absquaring channel made ineffective. By linear control is meant operation using a control function having only those terms which are characteristic of a linear differential equation. The procedure used in such preliminary adjustment is covered in the following section.

*Preliminary Adjustment for Linear Control*

In order to operate the system under linear control, the control system is set up as shown in FIG. 1 with the absquaring channel (line 147) open-circuited and with the gain changers 59, 96, 116 omitted. Thus the only signal components which are fed into the adder 70 are proportional to the deviation $x$, its first derivative $x'$ and its second derivative $x''$. The control function $\Sigma$ for linear control is given by the following:

$$C\Sigma = C[x + A_1 x' + A_2 x''] \qquad (2)$$

where C, $A_1$ and $A_2$ are constant coefficients which must be determined. Since the expression is linear, the determination of coefficients capable of yielding stable operation is well within the skill of the art. Procedures which may be used are set forth in various texts on automatic control. For example, Thaler and Brown in Servomechanism Analysis, McGraw-Hill, 1953 (p. 6 et seq.) describe a procedure which makes use of the following transfer functions for an automatic controller:

$$K_1 F(s) = K_1 \left( \frac{1}{s} + A_1 + A_2 s \right) \qquad (3)$$

where $K_1$ is a constant, $s$ is an operator, $F(s)$ is a function of $s$ and $A_1$ and $A_2$ are the constants set forth above. Let $K_2 C(s)$ denote the known transfer function of the system to be controlled, where $K_2$ is a constant and $C(s)$ is another function of $s$. As described by Thaler & Brown at pages 127–136, the total transfer function of the control loop, when the loop is broken, is therefore $$K_1 K_2 F(s) C(s) \qquad (4)$$

Assumed values are applied to C, $A_1$ and $A_2$, and roots are determined for the following equation:

$$K_1 K_2 F(s) C(s) + 1 = 0 \qquad (5)$$

The roots should have large negative real parts for stability. A simple method for obtaining these roots is found in my article in the American Mathematical Monthly, June–July, 1948 (pp. 335–342). If the polynomial is of a very high degree and difficult to solve, the test for stability used by Routh may be applied as covered in the Thaler and Brown text, p. 151. By way of example, both $A_1$ and $A_2$ are usually less than unity and $A_2$ is usually less than $A_1$. Thus as a start, values of 1/5 and 1/25 may be assigned to $A_1$ and $A_2$ and may be varied until the Routh test shows stability. If necessary, slightly different values of $A_1$ and $A_2$ should be tried until stability is indicated. If desired, the recently developed "frequency response" technique may be used to determine values of $A_1$, $A_2$ and $K_1$ as described by Thaler and Brown at pp. 126, 138–147. After the coefficient $K_1$ is determined, it is a simple matter to determine the constant C from the expression $C = K_1/k_9$ where $k_9$ is the constant of the motor operator.

The above procedure yields the coefficients for linear control. The next step is to adjust the settings of the variable resistors in the controller to correspond to the values of such coefficients, in accordance with the following procedure.

It will be understood, first of all, that the tachometer generator produces a voltage which is proportional to speed. This is bucked against an auxiliary voltage to produce a net deviation voltage $x$. The magnitude of the auxiliary voltage is set by the control 34 so that $x=0$ at a particular speed, such speed being defined as the control point. Any departure of speed from the control point causes a corresponding departure in the deviation voltage.

In order to get rid of the noise in the signal, it is passed through the filter 50. The filter is preferably adjusted to have as short a time constant as possible consistent with adequate filtering and which in the case of an internal combustion engine is about 1/100 sec.

At the output of the filter 50 the filtered signal voltage is $k_1 x$ where $$k_1 = \frac{R_{54} + R_{53}}{R_{53}} \qquad (6)$$

The signal voltage undergoes further transformation upon passing through the adder 70, being multiplied in the ratio $R_{155}/R_{151}$. The overall change in $x$ therefore from the input terminal 35 to the output terminal 75, and which by definition is the coefficient C, is given by the expression $$C = k_1 \frac{R_{155}}{R_{151}} \qquad (7)$$

$R_{155}$ may be assigned a convenient value of $10^6$ ohms. It is also convenient to make $R_{54} = R_{53}$ and it will therefore be assumed throughout that $k_1 = 2$, keeping in mind, however, that the gain of the entire loop may be changed by adjusting these two resistors in some other ratio. Since coefficient C is known by calculation, the above expression gives the proper setting for $R_{151}$ in the deviation channel.

Next, the first derivative signal $CA_1 x'$ is formed using the differentiator 80 and inverter 90, the differentiator being supplied with a signal $2x$ from the filter 50. It is desirable to provide additional filtering in this channel, hence the resistor 82 is provided, forming an RC filter with the differentiating capacitor 81. The value of the capacitor may be conveniently taken as $10^{-6}$ farads. The filter $R_{82} C_{81}$ may have a time constant of about 1/100 second. Thus $R_{82}$ is fixed at $10^4$ ohms. In order to avoid any attenuation of the coefficient while differentiating, the resistor 84 is chosen so that $$R_{84} C_{81} = 1 \qquad (8)$$

Since $C_{81}$ is $10^{-6}$ farads, then $R_{84}$ must be $10^6$ ohms. Because of the inversion which takes place in the differentiator, the output voltage is $-2x'$ and an inverter 90 is used to restore proper sign. In the inverter 90, the resistors 91, 93 are made equal to avoid any attenuation, although it should be kept in mind that the derivative signal may be attenuated here if desired simply by adjusting the ratio of $R_{93}/R_{91}$. Using equal values for resistors 93 and 91 results in a voltage of $2x'$ at the terminal 94 for feeding into the signal adder.

The signal to be obtained at the output of the adder 70 is $CA_1 x'$. The derivative signal undergoes a change when passing through the signal adder 70 which is expressed by the ratio $R_{155}/R_{152}$. Thus $$2x' \frac{R_{155}}{R_{152}} = CA_1 x' \qquad (9)$$

The resistance $R_{155}$ was previously set at $10^6$ ohms. The values of $A_1$ and C were previously calculated so that $R_{152}$ may be obtained from (9) above.

Next, attention is given to the second derivative signal which is produced by the second differentiator 100 and inverter 110. The differentiator is supplied with a signal $2x'$ from point 94 in the first derivative channel. The procedure for obtaining the resistor settings for the second derivative signal is completely analogous to that set forth above. Additional filtering is provided by the resistor 102 in combination with the differentiating capacitor 101. As before, the capacitor 101 is chosen at a convenient value, any $10^{-6}$ farad, $R_{102}$ is chosen to provide a time constant of 1/100 second or less, and $R_{104}$ is chosen so that the signal coefficient is not attenuated. This produces an output voltage $-2x''$. The latter is inverted in the inverter 110 with $R_{113}$ set equal to $R_{111}$ so that the output voltage of the inverter is $2x''$.

The desired second derivative output signal from the adder 70 is $CA_2x''$. The expression relating to input and output is $$2x'' \frac{R_{155}}{R_{153}} = CA_2x'' \qquad (10)$$

The only unknown in this expression is $R_{153}$ which may be numerically determined. This completes the preliminary adjustment of the control device for linear control and the system may now be turned on and should operate stably. Small trimming adjustments may be made in the settings of the resistors 151, 152 and 153 to vary the amount of each of the components to improve the control in response to disturbances such as changes in loading. The filters may also be adjusted to minimize servo jiggle while keeping the filter time constants as short as possible.

*Adjustment of Nonlinear Channel*

Attention is next given the channel which feeds the absquaring resistor 148. This channel includes a third differentiator 130 for taking a third derivative, using as input the second derivative signal from the inverter 110. Further filtering is provided by the resistor 132. As a first step, the capacitor 131 is assigned a convenient value of $10^{-6}$ farad and the associated resistors 132, 134 are chosen to provide a time constant of 1/100 second and unity gain respectively as in the case of differentiators 80 and 100. The output of the third differentiator is therefore $-2x'''$. This signal is fed into the derivative adder 120 where it is attenuated in the ratio $R_{146}/R_{143}$. Since the sign is also reversed, the third derivative component at the ouput of the derivative adder is $2(R_{146}/R_{143})x'''$. For convenience, resistor 146 may be assigned a value of $10^6$ ohms. The resistance $R_{143}$ is however unknown, and, to determine the proper setting for the resistor, the system is put into operation on linear control with the highest or third order derivative absquaring term added.

Accordingly, the input terminals 121, 122 of the derivative adder are open-circulated and the system is started. Starting with a high value for $R_{143}$, the resistance is gradually cut down until the jiggle of the pilot valve in the motor operator is the maximum which can be tolerated for the particular application. The final value of $R_{143}$ is then noted and the system may be shut down.

Referring to FIG. 1, the signal fed into the absquaring resistor is of the form $k_7(x' + a_1x'' + a_2x''')$, the third derivative term being $k_7a_2x'''$. Thus $$2 \frac{R_{146}}{R_{143}} x''' = k_7 a_2 x''' \qquad (11)$$

The only unknown in this expression is $k_7$, the resistances having been determined and $a_2$ being known. Knowing $k_7$, it is possible to determine the proper settings for resistors 142 and 141. In the case of $R_{142}$ which has an input signal of $-2x''$, we know that $$2x'' \frac{R_{146}}{R_{142}} = k_7 a_1 x'' \qquad (12)$$

The quantity $a_1$ is known, being defined as the sum of the lags, thus giving the value of $R_{142}$. Similarly, in the case of $R_{141}$ which is fed by a signal $-2x'$, we know that $$2x' \frac{R_{146}}{R_{141}} = k_7 x' \qquad (13)$$

enabling $R_{141}$ to be ascertained.

Hence at the output of the derivative adder 120 the total signal is given by $$2 \frac{R_{146}}{R_{141}} x' + 2 \frac{R_{146}}{R_{142}} x'' + 2 \frac{R_{146}}{R_{143}} x''' \qquad (14)$$

which is equal to $$2 \frac{R_{146}}{R_{141}} \left[ x' + \frac{R_{141}}{R_{142}} x'' + \frac{R_{141}}{R_{143}} x''' \right] \qquad (15)$$

This is the signal which is fed into the absquaring resistor 148. In order to determine the signal at the output of the adder 70 and after passing through the absquare resistor, the coefficient of the adder between the input terminal 74 and the output terminal 75 must be determined. This is accomplished by disconnecting the adder 70 from the circuit and by applying a sinusoidal voltage having a peak value $c_1$ to the input while reading the peak value $c_0$ of the output. This gives an absquare adder coefficient of $k_a$ where $$k_a = \frac{c_o}{(c_i)^2} \qquad (16)$$

After passing through the adder, the nonlinear signal becomes $$4k_a \left( \frac{R_{146}}{R_{141}} \right)^2 \text{absquare} \left[ x' + \frac{R_{141}}{R_{142}} x'' + \frac{R_{141}}{R_{143}} x''' \right] \qquad (17)$$

Comparison with expression (1) above shows that $$cb = 4k_a \left( \frac{R_{146}}{R_{141}} \right)^2 \qquad (18)$$

All of the factors in this expression are known except the gain coefficient $c$, which can be determined numerically.

Knowing $c$, it is possible to readjust resistors 151, 152 and 153 to give the proper coefficients in the linear channels, namely, $cx$, $ca_1x'$ and $ca_2x''$ required for full nonlinear operation. The voltage at the input side 71 of resistance 151 is $2x$ which is multiplied by $$\frac{R_{155}}{R_{151}} = cx$$

when going through the adder. Thus $$2x \frac{R_{155}}{R_{151}} = cx \qquad (19)$$

from which $R_{151}$ may be numerically obtained. Similarly, the first derivative voltage at the input 72 of the adder is $2x'$, therefore, $$2x' \frac{R_{155}}{R_{152}} = ca_1 x' \qquad (20)$$

from which $R_{152}$ may be obtained. Also the second derivative voltage at the input 73 of the adder 70 is $2x''$, thus $$2x'' \frac{R_{155}}{R_{153}} = ca_2 x'' \qquad (21)$$

which determines $R_{153}$. This completes the setting of all the resistors to provide a total nonlinear signal of $-ce$ at the output terminal 75 of the adder 70.

*Use of Gain Changers*

An automatic control system constructed as shown in FIG. 1 and adjusted as outlined above will produce satisfactory control in systems where the signal components corresponding to the high order derivatives, say those higher than the third, are so low as to be negligible. Satisfactory operation is believed to be due in some measure to the particular shape of the nonlinear resistor characteristic for low signal values. Although it is by no means obvious from the characteristic shown in FIG. 2, I have observed that commercially available nonlinear resistors, for example, thyrite, depart from a true parabolic shape and become linear in the region of the origin. This tends to reduce any tendency toward cycling about the control point.

It is found in practice that the nonlinear signal obtained as above when fed into a high speed motor operator results in movement of the final control element at substantially top speed even in response to relatively small speed disturbances. The present system is characterized by an average servo speed which is many times greater than conventional linear control systems where full speed of the final control element occurs only during the most extreme departures of the condition from the control point. While such rapid response brings about a number of advantages, it is found that with some controlled systems, there is a tendency toward abrupt "on-off" action in the region of the control point which is evidenced as low amplitude cycling.

While low amplitude cycling is not per se objectionable, I have found that operation under conditions approaching equilibrium may be improved by reducing the relative effectiveness of the absquare signal in the region of the control point. This is accomplished in the present instance by interposing gain changers in one or more of the linear channels to change the gain to a more favorable value when the magnitude of the signal in the respective channel is less than a predetermined low value. More specifically, I provide gain changers in the deviation channel, as well as in the first and second derivative channels, so adjusted that when the respective signals are small, as they will normally be with the system in the region of the control point, the gain of the channel is changed to correspond to that gain which would be employed for straight linear control. This will be made clear by reviewing the adjustment procedure outlined in the preceding section. It will be recalled that during the adjustment procedure the system was, as a preliminary step, adjusted for stable operation at the control point with the absquaring channel disconnected. Such preliminary adjustment involved determination of coefficients C, CA$_1$ and CA$_2$ and corresponding adjustment of the gain in each channel to give such control coefficients. This was accomplished by adjusting the channel resistors. Subsequently, with the full control circuit, including the absquaring channel, in operation, the circuit resistances were adjusted to provide a different set of control coefficients, namely, c, ca$_1$ and ca$_2$.

In carrying out the present invention the gain changers, indicated in FIG. 1 at 59, 96 and 116 (in FIG. 1 and throughout the drawings, the blocks representing gain changers are labelled with the letters "GC"), are connected in the x, x' and x" channels to perform the following respective functions:

(1) Gain changer 59 changes the coefficient of x from c to C whenever the absolute value of the x component is less than a predetermined amount x$_1$.

(2) Gain changer 96 changes the coefficient of x' from ca$_1$ to CA$_1$, whenever the absolute value of the x' component is less than a predetermined amount x$_1$'.

(3) Gain changer 116 changes the coefficient of x" from ca$_2$ to CA$_2$ whenever the absolute value of the x" component is less than a predetermined amount x$_1$".

The points x, x' and x" at which the change in gain takes place may be referred to as "break points." In general, since transfer occurs for both positive and negative values of signal, they define narrow bands of "low signal" operation. I have found that it is desirable to individually narrow down these bands as much as possible. The procedure for setting the band width is covered in the subsequent section on adjustment.

The change in gain, i.e., coefficient, at the break point, may be up or down depending upon whether the desired "low signal" coefficient is greater or less, than the "high signal" coefficient. In the device under discussion, the gain in the deviation channel is decreased under low signal conditions while the gain in the first and second derivative channels is increased. In the present device the circuit used for reducing the gain differs from that employed for increasing the gain. Where an increase in gain is desired under low signal conditions, I prefer to use the circuit arrangement shown at 199 in FIG. 4. Such circuit includes an operational amplifier 200 having an input resistor 201 and a shunt resistor 202. Means are provided for changing the value of the effective shunt resistance in order to change the gain. In the present instance the value of the shunt resistance is reduced by shorting across resistor 202 a double diode 203, 204 having a series resistor 205 and which conducts when the input signal is greater than the break point but which is nonconductive and therefore ineffective when the input signal is less than the break point. The first diode 203 is supplied by a voltage divider consisting of resistors 206, 207. The voltage divider is above ground potential so that the first diode is effective for positive input signals. The second diode is connected to a second voltage divider consisting of resistors 208, 209, which is below ground potential, with the result that the diode 204 is effective for negative input signals. The polarity of the input signal is restored by an inverter 210 of unity gain. The resistances R$_{207}$ and R$_{208}$ are taken small compared to R$_{202}$ and R$_{205}$.

Figure 4:
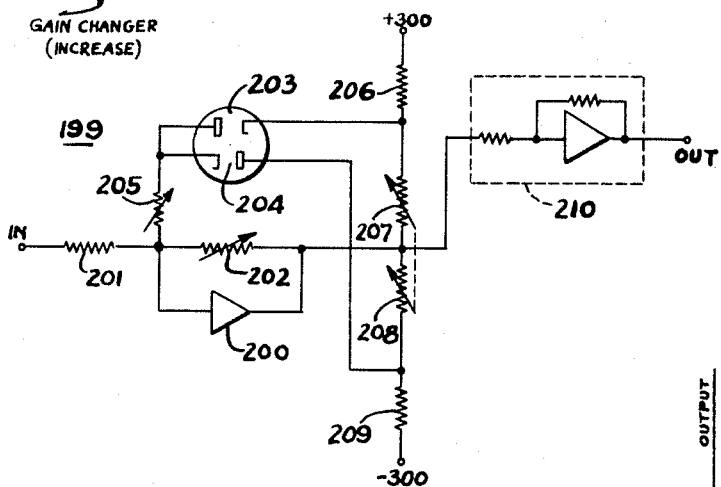
FIG. 4 shows schematically a circuit used for increasing gain employed in the system of FIG. 1.
Figure 5:
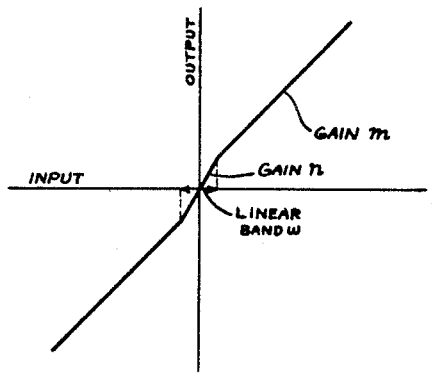
FIG. 5 shows the output characteristic of the circuit of FIG. 4.

The operation of the circuit and the adjustment of the various resistors will be made clear upon reference to FIG. 5, which shows the desired output characteristic. For operation beyond the break point, the gain changer should have a gain m of unity, as indicated. For signal values of less than the break point the gain changer should have a gain of n which, in FIG. 4, is larger than m. The low signal bandwidth is indicated at w. For the three gain changers, 59, 96 and 116, n is defined by the ratios C/c, CA$_1$/ca$_1$, and CA$_2$/ca$_2$, respectively.

Since m by definition is unity, and assuming the resistance of the conducting diode to be negligible, then $$R_{201} = \frac{R_{202}R_{205}}{R_{202}+R_{205}} \quad (22)$$

during conduction and $$R_{202} = nR_{201} \quad (23)$$

during nonconduction. The above two expressions include three unknowns. A value is therefore arbitrarily assigned to R$_{201}$, say 10$^6$ ohms, which permits practical numerical values satisfying the above expression to be obtained for R$_{202}$ and R$_{205}$. This completes the gain adjustment but does not determine the break point. The break point is adjusted by varying the resistors 207, 208 to which function reference will be made. The magnitudes of the voltage supplied to the diodes, because of symmetry, are the same and resistors 207, 208 may be conveniently ganged together.

Figure 6:
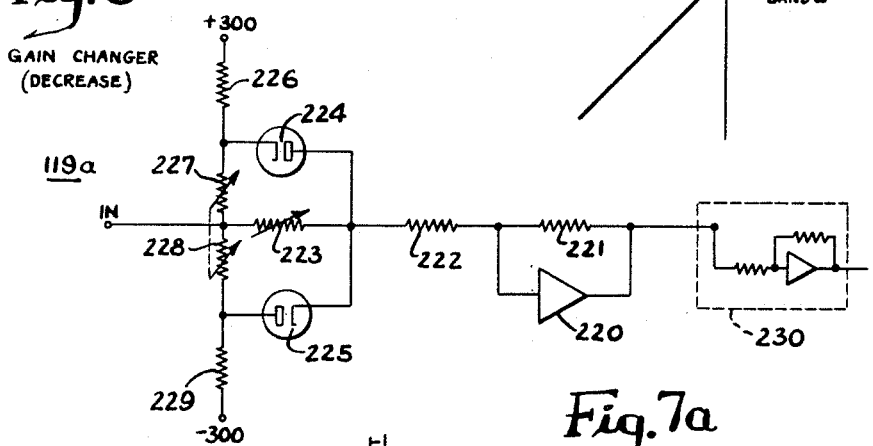
FIG. 6 shows schematically a circuit used for decreasing gain employed in the system of FIG. 1.
Figure 7:
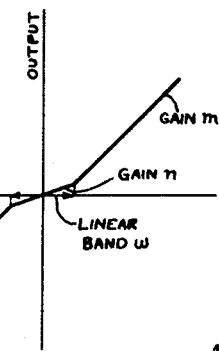
FIG. 7 shows the output characteristic of the circuit of FIG. 6.

The above discussion covers a gain changer for use where an increase in coefficient is desired within the "low-signal" range. Where a decrease of coefficient in such range is desired, I prefer to use the arrangement shown at 119a in FIG. 6, and whose characteristic in set forth in FIG. 7. In the circuit of FIG. 6 an operational amplifier 220 is used having a shunt resistor 221 and series resistors 222, 223. A double diode 224, 225 is used which conducts whenever the input voltage is beyond the break point and which is nonconducting when the voltage is below the break point. The diode 224 is connected to a voltage divider consisting of resistors 226, 227, which is above ground, and the diode 225 is connected to a voltage divider consisting of resistors 228, 229 below ground potential. It will be apparent that when either of the diodes is conductive the series resistor 223 is effectively shorted out. Under such circumstances the gain should have a value m, which is unity, as shown in FIG. 7. When the diodes are nonconductive the series resistor 223 is in the circuit and the gain has a lower value n, n being defined as set forth above. The polarity of the input signal is restored by an inverter 230.

Since m by definition is unity, and assuming the resistance of the conducting diodes to be negligible, $$\frac{R_{221}}{R_{222}+R_{223}} = 1 \quad (24)$$

during nonconduction, and $$R_{221} = nR_{222} \quad (25)$$

during conduction.

The above two equations have three unknowns, and the resistor 221 may be therefore assigned a convenient value of $10^5$ ohms. This permits practical numerical values to be obtained for resistors 222, 223.

The above covers the adjustment of the two values of gain, but does not cover the setting of the threshold points. This is accomplished by simultaneously varying the resistors 207, 208 (in FIG. 4) and 227, 228 (in FIG. 6) which are respectively ganged together. It is to be noted that the arrangement shown in FIGS. 4 and 6 enable the band width to be adjusted entirely independently of $m$ and $n$, the two values of gain. As an initial approximation the "low signal" bands may be adjusted for a width which is on the order of 10% of the maximum values of each of the respective variables. A more refined adjustment requires the system to be set in operation and a trimming adjustment to be made. With the system operating, the ganged resistors which control the band width are reduced progressively in each of the gain changers 59, 96 and 116. The gain changers should be adjusted in rotation, making the resistance in each case as low as possible without causing erratic operation or cycling about the control point when small disturbances are introduced into the system. A minimum band width in each channel insures that the coefficients corresponding to design non-linear control are effective, as close as possible to the control point. It will be found in a governor of the type described that the width of the low signal band in the $x$ channel will be approximately 2% of the maximum voltage in that channel, while the width of the bands in the derivative channels will be approximately 10% of the maximum voltage in each of these channels. In the event it is possible to reduce the controlling resistance to zero in any of the channels, it will be apparent that the gain changer in such channel is not needed and may be taken out of the circuit.

It is one of the features of the gain-changing arrangement described above that transfer of the entire net control signal from the nonlinear to the linear condition, upon approaching the control point, is entirely avoided. Any transfer between the two conditions of gain, on the contrary, occurs on an individual basis in the respective channels carrying the $x$, $x'$, or $x''$ signals and the criterion for change of gain is the signal level in the particular channel. Such individual transfers can, and normally will, take place at different times in the respective channels. The overall transfer from nonlinear to linear operation when the control point is approached therefore takes place in steps and there is no need for the system as a whole to "decide" whether to be linear or whether to operate according to the full nonlinear control function. This not only results in smoother control, avoiding tentative or indecisive action, but makes all circuit adjustments much less critical.

Figure 7A:
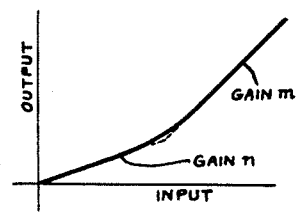
FIG. 7a is an enlarged view of one of the break-points in FIG. 7 showing the gradual transition between the two values of gain.

Nor is there any abrupt switching at the break point. In the circuits described vacuum diodes have been used in which there is no sharp break point and in which conduction increases more or less gradually over a range of plate voltage. This causes a rounding of the break point on the characteristic curves and a gradual change of gain from $m$ to $n$, the control "easing" from one condition to the other. Such transition, obtained in accordance with my teachings, is illustrated in FIG. 7a.

FIG. 1a is substantially identical in components and connections to FIG. 1, but differs only in that the system is rearranged in its drawing layout in order to illustrate the presence of linear and non-linear computers. For simplicity, the non-essential gain changers 59, 96, 116 and the amplifiers 90 and 110 have not been shown in FIG. 1a.

It will be seen from FIG. 1a that the engine 30 is a controlled element, whose speed is the variable condition controlled by the motor operator 160, 177, 181 acting on the throttle 31. The status or speed of the controlled element is sensed by the tachometer 32 which through the rectifier 36 produces a voltage representative of actual engine speed. The manually adjustable wiper of potentiometer 34 is a controlling element, and the position or status of the latter (i.e., desired reference speed) is indicated by the voltage thereon. These two voltages are bucked to produce a deviation or error signal equal to the difference in status. This error signal is supplied through the filter and amplifier 50 to the input 55 of a "linear computer" indicated by the dotted line enclosure. By virtue of the connection 57, the differentiator 80 and the differentiator 100, previously described, the output of this linear computer is constituted by signals proportional to the error, the first derivative of the error, and the second derivative of the error appearing on lines 57, 95 and 115. Since all of these signal components are linear, the dotted line portion is a computer which produces as its output a linear integro-differential function of the error.

The output of the "linear computer" forms the input to a "non-linear computer" comprised of resistors 71–73 and the thyrite resistor 148. The latter receives the output of summing amplifier 146 whose inputs are received from lines 87, 107 and differentiator 130. Thus, the output of the "non-linear computer" is the input to the summing amplifier 70 which produces on terminal 75 the net control signal $c\Sigma$ which has the continuous non-linear function represented by Equation 1, supra. This net control signal is supplied to the power system and actuates the latter so that it is turned "full on" or "full off" to correctively adjust the throttle and engine speed, except for linear operation when the error derivatives are small, as previously described.

It will be readily apparent to those skilled in the art that the principal components of the serially connected linear and non-linear computers are passive components which are small, reliable and readily available. That is, the thyrite resistor 148 for producing a non-linear ab-square signal is passive, as are the capacitors 81, 101, 131 which are the principal parts of the differentiators 80, 100, 130. The two computers illustrated in FIG. 1a may be constructed entirely of passive elements and the operational amplifiers 83, 103, 134, 145 omitted. In that case, amplifiers located either at the input of the linear computer or the output of the non-linear computer may be used to increase the final control signal to the desired level.

*Electronic Governor—Second Embodiment*

In the automatic control of relatively simple systems such as an internal combustion engine where the number of large lags and dead times is small, it is not necessary to employ the relatively elaborate setup shown in FIG. 1, and a number of simplifications may be introduced without great sacrifice in the quality of the control. By way of example, the arrangement shown in FIG. 8 differs from the more elaborate arrangement of FIG. 1 by absence of any means for generating a third derivative signal. In the systems shown in the subsequent FIGS. 9, 10 and 11, still further simplification has been brought about. While the adjustment of the circuits shown in FIGS. 8–11, inclusive, will be largely apparent in view of the discussion of the adjustment of FIG. 1 above, nevertheless the adjustment procedure applicable to each will be reviewed briefly for the sake of completeness of disclosure.

Figure 8:
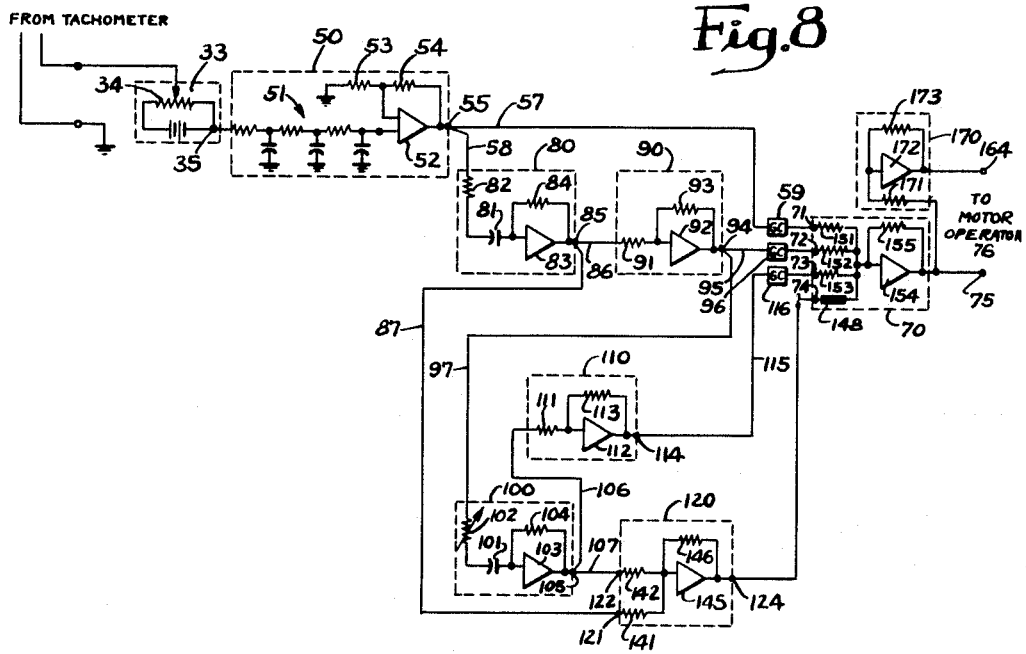

Referring to FIG. 8, the circuit components shown correspond to those in FIG. 1 and corresponding reference numerals are employed. The portion of the circuit to the right of terminals 75, 164 will be understood to be the same as in FIG. 1. In utilizing the circuit of FIG. 8, I employ the following form of control characteristic:

$$c\Sigma = cx + ca_1 x' + ca_2 x'' + cb \text{ absquare}[x' + a_1 x''] \quad (26)$$

As a preliminary step, the circuit is first adjusted to provide stable operation using linear control, and in accordance with the following control function:

$$C\Sigma = Cx + CA_1 x' + CA_2 x'' \qquad (27)$$

This requires knowledge of the linear coefficients C, $A_1$ and $A_2$, which are determined using known procedures already discussed. For linear control the absquaring channel is disconnected, for example, by opening the circuit at terminal 74 of the adder 70. The gain changers 59, 96 and 116 are omitted during this portion of the adjustment. The complete linear signal $-C\Sigma$ at the output, may be expressed in terms of the circuit parameters, as follows:

$$C\Sigma = \left(\frac{R_{54}+R_{53}}{R_{53}}\right)\left(\frac{R_{155}}{R_{151}}\right)x +$$
$$\left(\frac{R_{54}+R_{53}}{R_{53}}\right)R_{84}C_{81}\left(\frac{R_{93}}{R_{91}}\right)\left(\frac{R_{155}}{R_{152}}\right)x' +$$
$$\left(\frac{R_{54}+R_{53}}{R_{43}}\right)R_{84}C_{81}\left(\frac{R_{93}}{R_{91}}\right)R_{104}C_{101}\left(\frac{R_{113}}{R_{111}}\right)\left(\frac{R_{155}}{R_{153}}\right)x'' \qquad (28)$$

In order to simplify the expression, it is convenient to make all of the following resistances $10^6$ ohms: $R_{53}$, $R_{54}$, $R_{91}$, $R_{93}$, $R_{101}$, $R_{113}$, $R_{146}$ and $R_{155}$. To avoid coefficient attenuation while differentiating, $R_{84}C_{81}$ and $R_{104}C_{101}$ are both set equal to 1, this condition being satisfied by making $R_{84}$ and $R_{104}$ equal to $10^6$ ohms and $C_{81}$ and $C_{101}$ equal to $10^{-6}$ farad. With these simplifications, the above expression becomes $$C\Sigma = \frac{2R_{155}}{R_{151}}x + \frac{2R_{155}}{R_{152}}x' + \frac{2R_{155}}{R_{153}}x'' \qquad (29)$$

By equating coefficients in (27) and (29) above, it is seen that $$C = \frac{2R_{150}}{R_{151}} \qquad (30)$$

$$CA_1 = \frac{2R_{155}}{R_{152}} \qquad (31)$$

and $$CA_2 = \frac{R_{155}}{R_{153}} \qquad (32)$$

Since $R_{155}$ is $10^6$ ohms, the only unknowns are $R_{151}$, $R_{152}$ and $R_{153}$, which may be numerically obtained and the resistors set accordingly. The system may then be started and should operate stably.

With the system operating under linear control, trimming adjustments are made in the settings of resistors $R_{151}$–$R_{153}$, if necessary. The absquaring channel previously disconnected is now connected so as to inject a gradually increasing amount of second derivative absquaring signal. To do this, trimmer 121 is disconnected and resistor 142 is gradually decreased from a high value up to the point which produces maximum tolerable jiggle in the output or throttle servo. This circuit adjustment enables the gain coefficient c in expression (26) to be determined, the other coefficients $a_1$, $a_2$ and b being known. This is done as follows:

The nonlinear control function (26) is set forth in terms of the circuit parameters which affect it, thus $$c\Sigma = \left(\frac{R_{54}+R_{53}}{R_{53}}\right)\left(\frac{R_{155}}{R_{151}}\right)x +$$
$$\left(\frac{R_{54}+R_{53}}{R_{53}}\right)R_{84}C_{81}\left(\frac{R_{93}}{R_{91}}\right)\left(\frac{R_{155}}{R_{152}}\right)x' +$$
$$\left(\frac{R_{54}+R_{53}}{R_{53}}\right)R_{84}C_{81}\left(\frac{R_{93}}{R_{91}}\right)R_{104}C_{101}\left(\frac{R_{113}}{R_{J11}}\right)\left(\frac{R_{155}}{R_{153}}\right)x'' +$$
$$k_a \text{ absquare }\left[\left(\frac{R_{54}+R_{53}}{R_{53}}\right)R_{84}C_{81}\left(\frac{R_{146}}{R_{141}}\right)x' + \left(\frac{R_{54}+R_{53}}{R_{53}}\right)R_{84}C_{81}\left(\frac{R_{93}}{R_{91}}\right)R_{104}C_{101}\left(\frac{R_{146}}{R_{142}}\right)x''\right] \qquad (33)$$

In the above expression, $k_a$ is determined experimentally, being the ratio $c_o/c_i^2$, where $c_i$ is the sinusoidal input voltage to the absquaring resistor and $c_o$ the resulting output voltage at terminal 75, using the same test setup as described in connection with FIG. 1.

Taking advantage of the same simplifications as were made in the linear expression, (33) becomes $$c\Sigma = \frac{2R_{155}}{R_{151}}x + \frac{2R_{155}}{R_{152}}x' + \frac{2R_{155}}{R_{153}} +$$
$$k_a \text{ absquare }\left[\frac{2R_{146}}{R_{141}}x', \frac{2R_{146}}{R_{142}}x''\right] \qquad (34)$$

This may be rewritten $$c\Sigma = \frac{2R_{155}}{R_{151}}x + \frac{2R_{155}}{R_{152}}x' + \frac{2R_{155}}{R_{153}}x'' +$$
$$k_a 4\left(\frac{R_{146}}{R_{141}}\right)^2 \text{ absquare }\left[x' + \frac{R_{141}}{R_{142}}x''\right] \qquad (35)$$

Equating coefficients in expressions (35) and (26) gives the following:

$$a_1 = \frac{R_{141}}{R_{142}} \qquad (36)$$

from which $R_{141}$ may be determined, $$cb = 4k_a\left(\frac{R_{146}}{R_{141}}\right)^2 \qquad (37)$$

from which, knowing $R_{141}$, c may be determined, $$c = \frac{2R_{155}}{R_{151}} \qquad (38)$$

from which, knowing c, the setting of resistor 151 may be determined, $$ca_1 = \frac{2R_{155}}{R_{152}} \qquad (39)$$

from which the setting of resistor 152 may be determined, and $$ca_2 = \frac{2R_{155}}{R_{153}} \qquad (40)$$

from which the setting of resistor 153 may be determined.

This completes the determination of settings for design non-linear control in FIG. 8. After reconnecting the terminal 121, the system should operate stably, subject to minor trimming adjustments. Gain changers 59, 96 and 116 may be added to the circuit, if desired, in accordance with the procedure described in connection with FIG. 1.

*Electronic Governor—Third Embodiment*

Figure 9:
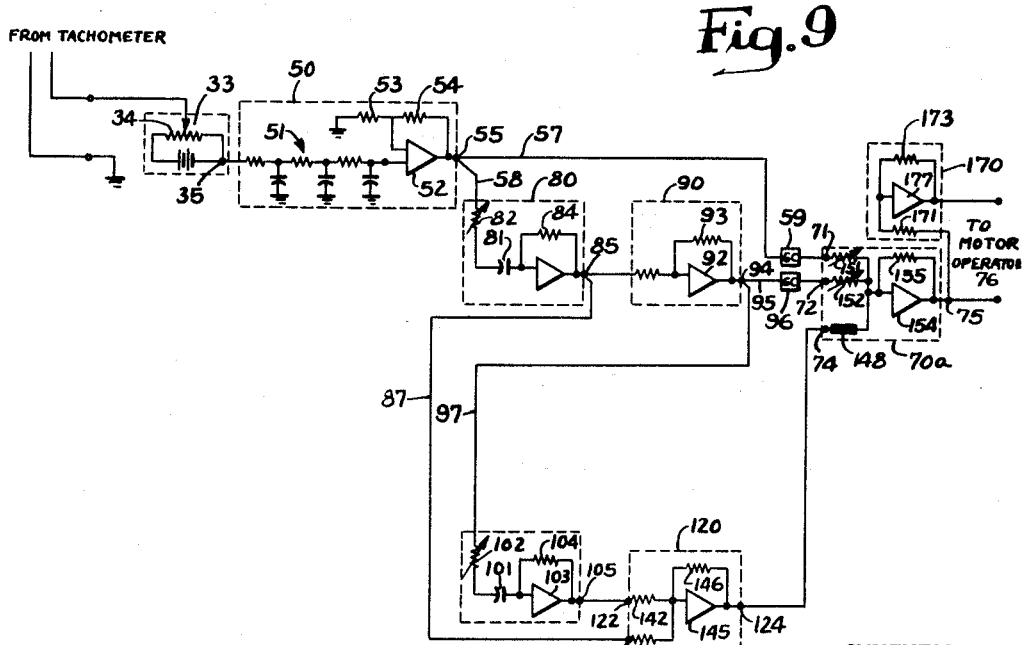

A further simplification is brought about in FIG. 9, which is similar to FIG. 8, except that no second derivative linear component is used, the control function being as follows:

$$c\Sigma = cx + ca_1 x' + cb \text{ absquare }[x' + a_1 x''] \qquad (41)$$

The first step is to adjust the system for linear control in accordance with $$C\Sigma = Cx + CA_1 x' \qquad (42)$$

where C and A are known, as above. For linear control, the absquaring channel is disconnected by backing off resistor 142 all the way and by opening the circuit at 121. Stated in terms of the circuit parameters, (42) becomes $$c\Sigma = \left(\frac{R_{54}+R_{53}}{R_{53}}\right)\left(\frac{R_{155}}{R_{151}}\right)x +$$
$$\left(\frac{R_{54}+R_{53}}{R_{53}}\right)R_{84}C_{81}\left(\frac{R_{93}}{R_{91}}\right)\left(\frac{R_{155}}{R_{151}}\right)x' \qquad (43)$$

For simplicity, the following resistors may be made $10^6$ ohms; $R_{53}$, $R_{54}$, $R_{84}$, $R_{91}$, $R_{93}$, $R_{104}$, $R_{146}$, and $R_{155}$. Also $C_{81}$ is chosen as $10^{-6}$ farad. Expression (43) then becomes $$c\Sigma = \frac{2R_{155}}{R_{151}}x + \frac{2R_{155}}{R_{152}}x' \qquad (44)$$

It is apparent that $$C = \frac{2R_{155}}{R_{151}} \qquad (45)$$

and $$CA_1 = \frac{2R_{155}}{R_{152}} \qquad (46)$$

Since $R_{155}$ is $10^6$ ohms, the only unknowns are $R_{151}$ and $R_{152}$, which may be numerically ascertained and the resistors set accordingly. The system may then be started and should operate stably.

The resistor 142 is advanced gradually until the jiggle of the throttle reaches the point of tolerance; the setting of the resistor then enables calculation of $c$, as follows:

The nonlinear control function is set up in terms of its parameters:

$$c\Sigma = \frac{2R_{155}}{R_{151}}x + \frac{2R_{155}}{R_{152}}x' + k_a \text{ absquare} \left[ \frac{2R_{146}}{R_{141}}x' + \frac{2R_{146}}{R_{142}}x'' \right] \qquad (47)$$

This expression may be rewritten $$c\Sigma = \frac{2R_{155}}{R_{151}}x + \frac{2R_{155}}{R_{152}}x' + 4k_a \left( \frac{R_{146}}{R_{141}} \right)^2 \text{absquare} \left[ x' + \frac{R_{141}}{R_{142}}x'' \right] \qquad (48)$$

Equating coefficients (48) and (41) gives $$a_1 = \frac{R_{141}}{R_{142}} \qquad (49)$$

$$cb = 4k_a \left( \frac{R_{146}}{R_{141}} \right)^2 \qquad (50)$$

$$c = \frac{2R_{155}}{R_{151}} \qquad (51)$$

$$ca_1 = \frac{2R_{155}}{R_{152}} \qquad (52)$$

from which $R_{141}$, $c$, $R_{151}$ and $R_{152}$ may be successively determined, $R_{146}$ and $R_{155}$ being $10^6$ ohms. The connection of terminal 141 is then reestablished and the circuit should operate stably. The gain changers may be added, if desired, in accordance with the procedure applied to FIG. 1.

*Electronic Governor—Fourth Embodiment*

Figure 10:
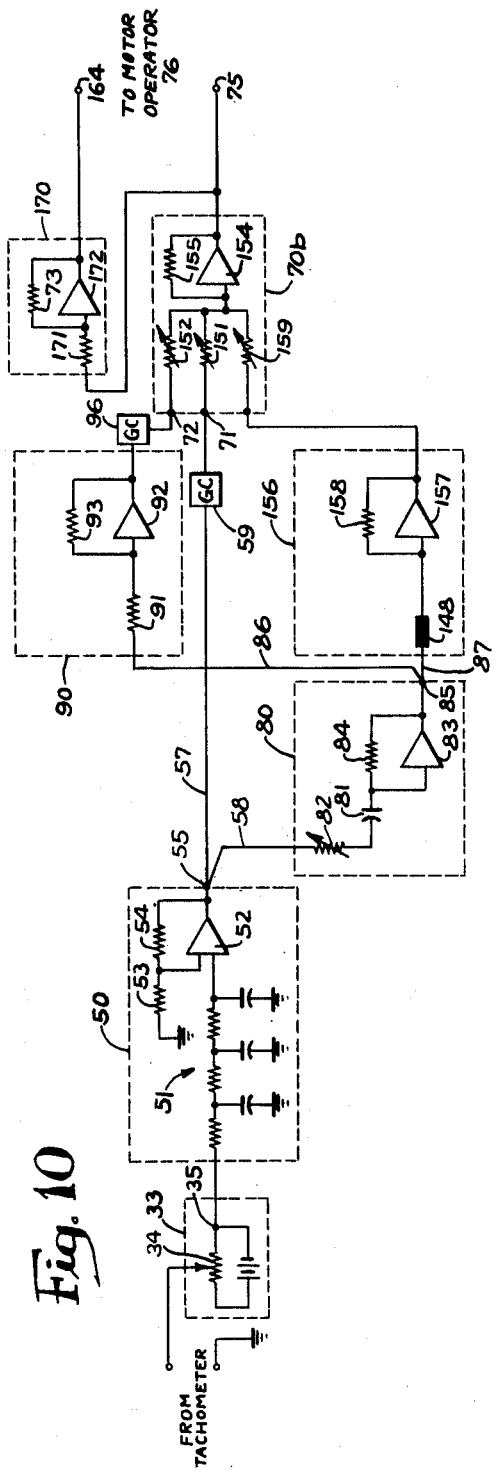

Simplifying the circuit still further, reference is made to FIG. 10, which is set up to perform the following control function:

$$c\Sigma = cx + ca_1 x' + cb \text{ absquare } [x'] \qquad (53)$$

This function has no terms beyond the first derivative. The circuit differs from that in FIG. 9 in that no second derivative component is required. This enables use of a simple absquaring unit 156 having an absquaring resistor 148, inversion being provided by an amplifier 157 having feedback resistor 158. A resistor 159 is used to vary the amount of absquare signal component.

The system as a preliminary stop is adjusted for operation in accordance with the following control function:

$$C\Sigma = Cx + CA_1 x' \qquad (54)$$

The resistor 159 is increased to reduce the absquare component to zero. Stated in terms of circuit parameters, and with certain of the resistors made equal to $10^6$ ohms, as covered in connection with FIG. 9, expression (54) becomes $$C\Sigma = \frac{2R_{155}}{R_{151}}x + \frac{2R_{155}}{R_{152}}x' \qquad (55)$$

The only unknowns in expressions (54) and (55) are $R_{151}$ and $R_{152}$, which may be numerically determined. The system should then operate stably about the control point. Resistor 158 is set equal to $10^6$ ohms and the resistor 159 is decreased in value until the point of objectionable jiggle is reached. The setting $R_{159}$ should be noted.

To obtain the settings of the resistors for design nonlinear control, expression (53) is written in terms of its parameters, as follows:

$$c\Sigma = \frac{2R_{155}}{R_{151}}x + \frac{2R_{155}}{R_{152}}x' + \frac{4k_a R_{155}}{R_{159}} \text{absquare } [x'] \qquad (56)$$

where $k_a$ is the ratio of voltage at the output of the absquare unit 156 related to a sinusoidal test voltage applied at the input of such unit.

Equating coefficients in (56) and (53) gives $$c = \frac{2R_{155}}{R_{151}} \qquad (57)$$

$$ca_1 = \frac{2R_{155}}{R_{152}} \qquad (58)$$

$$cb = \frac{4k_a R_{155}}{R_{159}} \qquad (59)$$

The only unknowns, $R_{151}$, $R_{152}$ and $c$ may be solved for and resistors 151 and 152 set accordingly to complete the adjustment for design nonlinear control. Gain changers 59 and 96 may be added if desired just as discussed in connection with FIG. 1.

*Electronic Governer—Fifth Embodiment*

Figure 11:
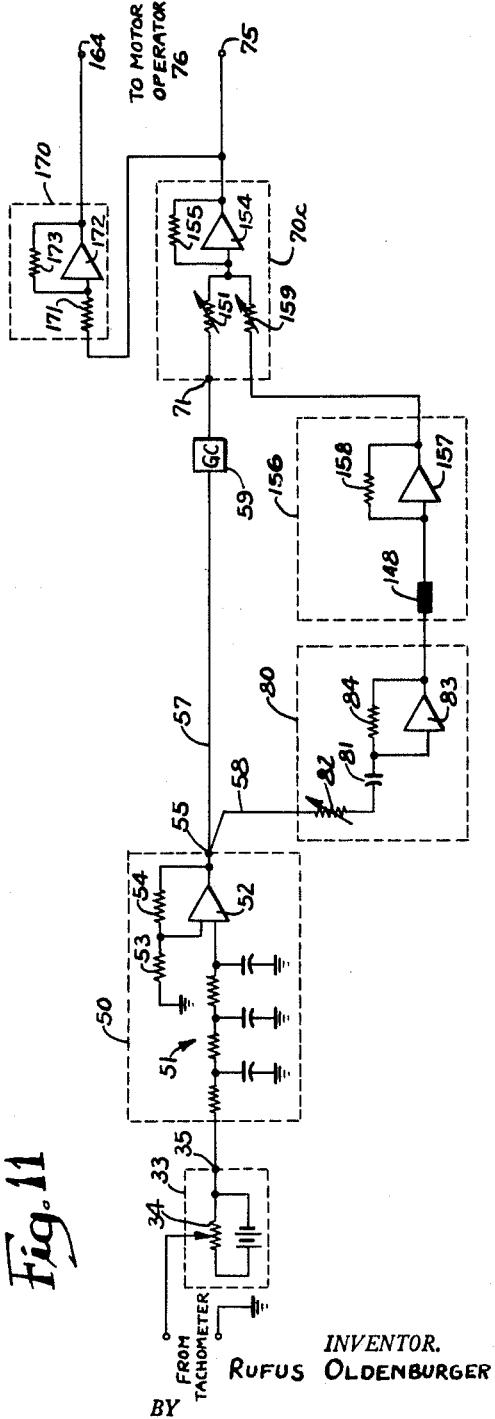

The simplest form of circuit which I propose for use as an electronic governor is shown in FIG. 11. The circuit includes means for generating a deviation signal together with means for generating a signal which is proportional to the absquare of the first derivative of the deviation signal, the control function reducing to:

$$c\Sigma = cx + cb \text{ absquare } [x'] \qquad (60)$$

It will be seen that FIG. 11 corresponds to FIG. 10, with the first derivative linear channel omitted and with similar terms being designated by similar reference numerals. Setting forth (60) in terms of the circuit parameters and assuming that $R_{53}$, $R_{54}$, $R_{84}$ and $R_{158}$ are each $10^6$ ohms, that $C_{81}$ is $10^{-6}$ farad, and that $k_a$ is determined as above, then $$c\Sigma = \frac{2R_{155}}{R_{151}} + \frac{4k_a R_{155}}{R_{159}} \text{absquare } [x'] \qquad (61)$$

Rewriting gives $$c\Sigma = \frac{2R_{155}}{R_{151}} \left[ x + 4k_a \left( \frac{R_{155}}{R_{159}} \right) \text{absquare } [x'] \right] \qquad (62)$$

from which, comparing (60) and (62), it follows that $$c = \frac{2R_{155}}{R_{151}} \qquad (63)$$

and $$b = 4k_a \left( \frac{R_{151}}{R_{159}} \right) \qquad (64)$$

Resistance $R_{155}$ can be taken to be $10^6$ ohms. Resistor 159 is gradually decreased in value until the jiggle point of the throttle is reached, which enables the value of $R_{151}$ to be obtained from (64). Both resistors 151 and 159 are trimmed, as necessary to establish satisfactory control. Gain changer 59 is used, if desired, in accordance with the discussion of FIG. 1.

In view of the extreme simplification evident in FIG. 11, and in view of the apparent absence of all of the linear derivatives, the setup shown in FIG. 11 has been given particular attention. It appears that successful operation may be attributed in large measure to the characteristic shape of nonlinear resistor materials such as thyrite, about the point of origin. As the point of origin is approached, the characteristic curve departs from its distinctive parabolic shape, becoming linear for small signal values. This being the case, it may be shown that there is an automatic transformation, from nonlinear to substantially linear, control for low signal values. This reduces the relative effect of the absquare signal component for small disturbances. The change which occurs around the origin is effectively an increase in the gain of the first derivative component and a decrease in the gain of the absquare component. The same effect occurs in the more elaborate versions of the electronic governor. In such versions, however, the effect is an incidental one, and primary reliance is not placed upon it.

It should be kept in mind in comparing the arrangements shown in FIGS. 1 and 8–11 inclusive, that they have in common the feature that the servo and connected throttle move at high speed, even for relatively minor deviations from the control point.

A typical transient characteristic obtained using the nonlinear control system described above is shown in FIG. 12, where speed departure from the control point is plotted as a function of elapsed time. Starting from a condition of equilibrium, sudden change in loading causes a departure in speed at an initial rate designated $x_0'$. This produces a net control signal $c\Sigma$, which causes the engine throttle to be correctively moved. Movement takes place at full speed in the corrective direction until reaching point B, at which time the throttle is moved in the opposite direction at substantially full speed, thereby restoring the speed back to equilibrium in a minimum time, and with minimum underswing and overswing. In the region of the control point, control becomes linear, thereby minimizing cycling about the control point and tempering the control action for minor disturbances. Because of this operation, the nonlinear control system is aptly termed a "predictor" type system, since the net control signal switches the motor operator from "full on" one direction to "full off" at the point B in FIG. 12. In other words, a sudden disturbance is corrected by moving the throttle 31 first at maximum speed in one direction until point B is reached, then moving the throttle 31 at maximum speed in the opposite direction, and then moving the throttle at speeds which are substantially linear functions of the deviation and derivatives until equilibrium is reached. The nonlinear function $c\Sigma$ described above causes the point B to be selected in a manner which "predicts" the proper time instant for reversal in the direction of the motor operator.

ELECTROMAGNETIC NONLINEAR GOVERNOR

My teachings may be applied with equal advantage to nonelectronic control systems. In the preceding sections, an electronic type of governor was described with the several embodiments arranged in order of decreasing complexity. It is the purpose of the present section to describe a system employing magnetic amplifier components rather than electronic components. As the description proceeds, it will, however, be apparent that the operation is basically much the same as that covered above. The use of a magnetic amplifier is accompanied by a number of advantages which are particularly valuable in specialized automatic control applications. Thus, magnetic amplifiers can be constructed with extreme compactness and component devices are commercially available which are subseantially proof against shock and vibration. Since magnetic amplifiers obviate the need for vacuum tubes and require little maintenance, the control system to be described is particularly useful for military and civilian uses where reliability is paramount.

For convenience, the motor operator 76a in the electromagnetic control system is the same as the motor operator 76 in FIG. 1 with the exception that the cathode follower stage is replaced by a magnetic limiting device.

Referring now to the input channel at the left-hand side of FIG. 13, a potentiometer 34 is provided for setting the control point. The net signal which appears at terminal 35 is the deviation signal which is fed into a filter 300 having output lines 301, 302. The filter performs the same function as the filter 50 discussed in connection with FIG. 1, in that it tends to remove the electrical noise in the input signal, and may, for example, have a time constant of 1/100 second. The signal in the output line 301 is utilized directly, flowing through an optional gain changer 304, and a series resistor 303 to a signal adder 305. The adder has input terminals 310–314, and output terminals 315 and 316. The purpose of the signal adder 305 is to add together all of the components of an error signal and its derived components to form a net signal used to control the servo device 177.

Referring back to the line 302 at the output of the filter, a first differentiator unit 320 is provided having a differentiating capacitor 321, and a magnetic amplifier 322. The magnetic amplifier has a pair of input terminals 323, 324 and a pair of output terminals 325, 326. The magnetic amplifier 322 is further provided with terminals 327 which are connected to a source of D.-C. bias and terminals 328 which are connected to a source of exciting current having a frequency of about 400 cycles per second or greater. In order to remove the alternating current component from the output signal, the differentiating unit may, if desired, include a filter 329. The design of this filter is well within the capability of one skilled in this art. Where an exciting frequency of 400 cycles per second is employed, the filter should be capable of blocking an A.-C. component of 800 cycles per second without substantially affecting variations in the input signal on the order of 16 cycles per second. The filter 329 will produce a certain amount of attenuation of the signal passing through it, which, as a practical matter, can be exactly compensated for by additional gain provided elsewhere in the channel. However, to simplify the present presentation it will be assumed that the present filter, and the other filters referred to herein, have means integrally included for compensating for loss in signal level.

The design of the magnetic amplifier 322 will be described in detail in connection with FIG. 14. It will suffice for the present to say that the signal appearing at the output terminals coincides in direction with the signal applied to the input terminals, but is multiplied by a gain factor which may be on the order of 900. As a result of the action of the differentiating capacitor 321, the signal appearing at the output of the differentiator unit 320 is proportional to the first derivative $x'$ of the deviation signal. The derivative signal is applied to two lines 331, 332. The first line 331 carries the directly utilized signal which is fed to the terminal 312 of the signal adder 305 via an optional gain changer 334 and series resistor 333.

In order to obtain a second derivative signal, a second differentiator unit 340 is used having a differentiating capacitor 341, and a magnetic amplifier 342. The magnetic amplifier may be identical to that used in the preceding stage. The output of the magnetic amplifier 342 is passed through a filter 349 which is the same as filter 329 and applied to two lines 351, 352. The second derivative signal on line 351 is applied to input terminal 313 of the adder 305 via an optional gain changer 354 and a series resistor 353. The signal components applied to terminals 311, 312 and 313 of the signal adder form the linear portion of the control signal. The non-linear portion of the control signal is applied to input terminal 314 of the signal adder, as covered below.

In carrying out the invention, means are provided for adding together first and second derivative signals and for absquaring the sum. The addition is accomplished by a magnetic amplifier 360 having input terminals 361–

363 and output terminals 364–365. The input circuit of the magnetic amplifier 360 is set forth in detail in FIG. 15. D.-C. bias is supplied to the amplifier via terminals 367 and A.-C. excitation via terminals 368.

The first derivative signal from the differentiator 320 is fed to terminal 361 via a resistor 370 while the second derivative signal is fed to input terminal 362 through a resistor 371. Connected to the output terminals of the magnetic amplifier 360 is a filter 369, which is of the same type as the filters 329 and 349 previously referred to. The net signal from the amplifier 360 is then fed to an absquaring resistor 380 which has the same output characteristic as set forth in FIG. 2.

The input circuit for the magnetic amplifier 305 which serves to add together the four separate signal components, is set forth in detail in FIG. 16, and will be discussed at a later point. It will suffice to say that the output signal appearing at terminals 315, 316 is the sum of the input signal components multiplied by a gain factor. Following the amplifier 305 a limiter 390 is provided having input terminals 391, 392 and output terminals 393, 394, the output terminals being connected to the winding 176 of the servo pilot valve. The construction and operation of the limiter is set forth in a subsequent section. It will suffice for the present to say that the limiter limits the maximum current to the relay winding 176 to avoid overheating or burnout of such winding and to minimize impact against the stops.

*Magnetic Amplifier Circuit*

The magnetic amplifiers which have been used in the magnetic amplifier version of the governor shown in FIG. 13 are simply amplifiers in which the output varies substantially linearly with the input and in the same direction. Where more than one input terminal is provided it will be understood that the signals flowing into such input terminals are algebraically added and the net signal is effective to pass through the amplifier. Magnetic amplifiers capable of meeting these requirements are known to one skilled in this art and the following brief description is offered.

The basic circuit of the magnetic amplifiers 322, 342 is shown in FIG. 14, the amplifier 322 being taken as representative. Amplification depends upon the change in the inductance of four inductors 401–404 which have exciting windings 401a–404a, bias windings 401b–404b, and input windings 401c–404c to which the input signal is applied. Each of the inductors has a core of high permeability magnetic material with windings compactly arranged to reduce leakage reactance to a minimum. As is conventional with magnetic amplifiers, an A.-C. exciting voltage, of approximately 400 cycles, is applied to the terminals 328.

In order to limit the flow of exciting current to pulsating D.-C. rectifiers 411–414 are provided, the exciting windings being connected in pairs 401a, 402a and 403a, 404a, respectively, to provide a full wave of output current. Such output current is then rectified by full wave rectifiers 415, 416. The output circuits of rectifiers 415, 416 are connected in bucking relation, each having an output resistor 417, 418, respectively. The net output is fed to a second stage of amplication 419 which may have the same circuit as the first stage.

For the purpose of adjusting the bias voltage applied to the bias terminals 327, a source of variable D.-C. 420 is provided. The bias voltage is adjusted so that the output signal in each half of the circuit is in the middle of its linear range for a zero input voltage. Since the input windings 401c, 402c on the one hand, and 403c, 404c on the other, are connected in the opposite sense, the individual output signals are as shown at 421, 422 in FIG. 17. Consequently, the net output voltage appearing at the output terminals, being the sum of two linear components, varies linearly on each side of the zero point as shown at 423 in FIG. 17. For a more detailed description of magnetic amplifiers of the above general type, reference is made to "Magnetic Amplifiers" copyrighted in 1948 by Vickers, Inc.

The magnetic amplifier 360 is similar to that described above, except that the magnetic amplifier serves also as an adder, adding together the first and second derivative signals. To perform the addition, an additional set of input windings must be used as shown at 401d–404d in FIG. 15. Preferably, the magnetic amplifier 360 has only a single stage, since the function of amplification is merely incidental.

The magnetic amplifier 305 is also similar to that discussed except that input windings are provided for adding together signals from four separate channels. The arrangement of input windings is shown in FIG. 16, such windings carrying the subscripts $c$ to $f$, inclusive. Each of the channels from a given input terminal to the output terminal may be considered to have an amplification factor $\mu$.

In the discussion which follows, the amplification factor of a given amplifier is designated by a corresponding subscript and the resistance of each input circuit is designated by R with a subscript corresponding to the input terminal.

*Procedure for Adjusting Electromagnetic Governor*

The adjustment procedure used for adjusting the electromagnetic version of the governor as shown in FIG. 13 is analogous to that previously described by the electronic version. This procedure includes:

(1) Determination of coefficients for linear operation,
(2) Setting of the circuit constants (resistors) to produce such linear coefficients,
(3) Operating the system under linear control to determine the maximum amount of high derivative nonlinear signal which can be used,
(4) Determining the overall gain coefficient and the other coefficient for design nonlinear operation, and
(5) Setting the circuit constants to produce the desired coefficients.

With regard to step 1 above, it is unnecessary to repeat the procedure for obtaining the coefficients for the following linear contol function:

$$C\Sigma = Cx + CA_1 x' + CA_2 x'' \qquad (65)$$

since procedure for obtaining such coefficients has previously been covered in connection with the governor of FIG. 1. However, the problem still remains to adjust the circuit of FIG. 13 to produce such linear coefficients. In the following adjustment procedure the gain changers, which are optional, are considered as omitted from the circuit and will be discussed later in connection with FIG. 19.

Turning attention first to the coefficient C of the deviation $x$, it will be noted that the deviation signal passes through resistor 303, magnetic amplifier 305 and limiter 390. The limiter 390 may be disregarded, assuming that its gain is unity for signals of relatively small magnitude. In passing through a magnetic amplifier the signal is multiplied by a factor which comprises the product of the amplification factor and the input resistance of the magnetic amplifier divided by the sum of the external input resistance and the input resistance of the magnetic amplifier. Thus, $$C = \frac{\mu_{305} R_{311}}{R_{303} + R_{311}} \qquad (66)$$

All but $R_{303}$ are known in the above expression, enabling the setting of such resistor to be determined.

The coefficient of the first derivative term $x'$ may be similarly set up, being given by the following expression:

$$CA_1 = (\mu_{322} R_{321} C_{323}) \frac{(\mu_{305} R_{312})}{(R_{333} + R_{312})} \qquad (67)$$

In this expression the only unknowns are the values of the capacitor and resistor 333. For convenience, the value of 100 mf. may be assigned to the capacitor; the setting of resistor 333 is therefore known.

The coefficient of the second derivative term is given by the following:

$$CA_2 = (\mu_{322}R_{323}C_{321})(\mu_{342}R_{343}C_{341})\frac{(\mu_{305}R_{313})}{R_{353}+R_{313}} \quad (68)$$

In this case also it is convenient to assign a value of 100 mf. to the capacitor, thereby fixing the value of $R_{353}$. This completes the setting of the circuit constants for linear control. The system is then experimentally run in order to determine the maximum amount of the nonlinear signal component which may be used in accordance with stop 3 above.

In running the system, all of the inputs are connected to the magnetic amplifier 305. In the absquaring channel the terminal 361 is disconnected and the resistor 371 is adjusted for a large initial value. This reduces the amount of second derivative absquaring signal to a very small value. The resistance is then gradually reduced until the jiggle in the pilot valve becomes objectionable. This not only determines the value of resistor 371 for design nonlinear operation, but also enables the overall gain constant $c$ for nonlinear operation to be ascertained, as follows:

The complete nonlinear control function applicable to the electromagnetic governor is given by the expression:

$$c\Sigma = cx + ca_1x' + ca_2x'' + cb \text{ absquare } [x' + a_1x''] \quad (69)$$

Each coefficient in (69) above is set forth in terms of the circuit constants which affect it. Thus:

$$c\Sigma = \frac{(\mu_{305}R_{311})}{R_{303}+R_{311}}x + (\mu_{322}R_{323}C_{321})\frac{(\mu_{305}R_{312})}{(R_{333}+R_{312})}x' +$$

$$(\mu_{322}R_{323}C_{321})(\mu_{342}R_{343}C_{341})\frac{(\mu_{305}R_{313})}{R_{353}+R_{313}}x'' +$$

$$k_a \text{ absquare } \left[ (\mu_{322}R_{323}C_{321})\frac{(\mu_{360}R_{361})}{(R_{320}+R_{361})}x' + \right.$$

$$\left. (\mu_{322}R_{323}C_{321})(\mu_{342}R_{343}C_{341})\frac{(\mu_{360}R_{362})}{R_{371}+R_{362}}x'' \right] \quad (70)$$

In this expression $k_a$ is the constant of the absquaring resistor 380 and the associated channel 314 of the magnetic amplifier 305. The value of $k_a$ may be determined experimentally by applying a sinusoidal voltage $e_i$ to the absquaring resistor, reading the voltage $e_o$ at the output of the magnetic amplifier 305. Thus $k_a = e_o/(e_i)^2$.

The nonlinear portion of expression (70) may be simplified by factoring, to give $$k_a \frac{(\mu_{322}R_{323}C_{321}\mu_{360}R_{361})^2}{R_{320}+R_{361}} \text{ absquare}$$

$$\left[ x' + \frac{\mu_{342}R_{343}C_{341}R_{362}(R_{320}+R_{361})x''}{R_{361}(R_{371}+R_{362})} \right] \quad (71)$$

Upon comparing (71) with (69), it will be apparent that the coefficient of the second derivative, namely $a_1$, is given by the following expression:

$$a_1 = \frac{\mu_{342}R_{343}C_{341}R_{362}(R_{320}+R_{361})}{R_{361}(R_{371}+R_{362})} \quad (72)$$

The value of $a_1$ is known, being defined as the sum of the lags in the system. Thus, the only unknown in this expression is resistor 320, and the setting of such resistor for nonlinear operation may be numerically determined. Similarly, it will be seen that the coefficient $cb$ of the absquaring term is given by the following:

$$cb = k_a \text{ absquare } \left[ \frac{\mu_{322}R_{323}C_{321}\mu_{360}R_{361}}{R_{320}+R_{361}} \right] \quad (73)$$

The only unknown in this expression is $c$, so that a numerical value may be assigned to $c$. This completes determination of the constants for the nonlinear control function $c\Sigma$.

To obtain the settings of the remaining resistors for nonlinear operation, $ca_2$, $ca_1$ and $c$ in expression (69) are set forth in terms of their counterparts in expression (70). Thus $$ca_2 = \frac{\mu_{322}R_{323}C_{321}\mu_{342}R_{343}C_{341}\mu_{305}R_{313}}{(R_{353}+R_{313})} \quad (74)$$

This enables a numerical value to be ascertained for resistor 353. In the same manner $$ca_1 = \frac{\mu_{322}R_{323}C_{321}\mu_{305}R_{312}}{R_{333}+R_{312}} \quad (75)$$

This determines the setting for resistor 333. Also, $$c = \frac{\mu_{305}R_{311}}{R_{303}+R_{311}} \quad (76)$$

which enables evaluation of resistor 303. This completes the setting of the circuit constants for nonlinear control. The circuit as described should, however, be expected to produce satisfactory results only for certain types of controlled systems where the gain changing features, to be described in connection with FIG. 19, are not required.

*Use of Gain Changers in Electromagnetic Governor*

The operation about the control point may be improved by use of gain changers in the linear channels, just as in the case of the electronic version of the governor described above. By way of review, it will be recalled that the coefficient for, say, the deviation signal is not the same for design nonlinear control as it is for linear control. Thus, means are provided so that under low signal conditions the gain is that which corresponds to linear control. In the electronic governor diodes are used to change the gain, the input signal being bucked against a reference voltage to cause a diode to conduct for a certain range of voltage and effectively changing the resistance in the circuit. In the present version a modified form of gain changer is employed utilizing the nonlinear transmission characteristics of a dry selenium rectifier. I prefer to use for this purpose rectifiers having a characteristic substantially set forth in FIG. 2 in a bulletin published by Radio Receptor Company, Inc. of New York City, designated bulletin No. 104B.

Gain changers are inserted in the circuit at 304, 334 and 354 in FIG. 13, for changing the gain in the deviation channel and first and second derivative channels, respectively. Two types of gain changers are used, a first type which reduces the gain for low values of signal, and a second type which increases the gain of the channel for low values of signal. The type of gain changer to be used depends, of course, on the relative magnitudes of the coefficients previously determined for nonlinear versus linear operation. Which coefficient is the greater is dependent upon the constants of the system to be controlled. It will usually be found, however, in the controlling of internal combustion engines that the deviation channel will require a decrease in gain, while the first and second derivative channels will require an increase in gain under low signal conditions.

In the case of the electronic version, the gain changers were simply superimposed upon the basic control circuit since the circuits are inherently isolated. In the case of the electromagnetic version shown in FIG. 13, the problem is complicated by the fact that the circuits are not essentially isolated and the presence of the gain changers may therefore affect the setting of the other resistors in the circuit. Consequently, it is desirable when using gain changers to consider the circuit as a whole, for example, as set forth in FIG. 19. The gain changer 304 in the deviation channel produces a decrease in gain upon receipt of low values of signal, while the gain changers 334, 354 in the first and second derivative channels cause an increase in gain.

Elements in FIG. 19, which are the same as in FIG.

13, carry similar reference numerals. Turning attention to the gain changer 304, it includes a magnetic amplifier 421 having input terminals 422, 423 and output terminals 424, 425. The input is fed through a series resistor 420. Connected to the output terminal 424 is a resistor 426 which is shunted by a pair of oppositely facing rectifiers 427, 428. An additional series resistor 429 is provided for feeding a second magnetic amplifier 431 having input terminals 432, 433 and output terminals 434, 435. The two magnetic amplifiers 421, 431 each comprise a single stage arranged in accordance with FIG. 14.

The operation of the gain changer 304 will be described in the analysis which follows. It will be appreciated, however, from inspection of the circuit that the rectifiers 427, 428 present an open circuit for low values of input voltage, so that resistor 426 is in the circuit resulting in a low value of gain for the circuit as a whole. However, when higher input voltages are applied, the rectifiers effectively short-circuit the resistor 426 and the effective gain is correspondingly higher. The break point at which the change takes place may be varied by varying the relative gains of the two magnetic amplifiers 421, 431. The break point may be brought closer to the origin by increasing the gain of the magnetic amplifier 421 and correspondingly reducing the gain of the magnetic amplifier 431. The converse adjustment may also be made.

Referring next to the gain changer 334 in the first derivative circuit, it will be seen that it includes an input resistor 440 and a magnetic amplifier 441 having input terminals 442, 443 and output terminals 444, 445. The circuit differs from that described above since the device is intended for increasing gain for low signal values. Consequently a two-channel coupling circuit is used, one of the channels being grounded through a pair of rectifiers. Thus it will be noted that resistors 446, 447 have their junction point grounded by oppositely facing rectifier units 448, 449. In the opposite leg of the circuit coupling occurs through a resistor 450. Finally a magnetic amplifier 451 is provided having input terminals 452, 453, 454 and output terminals 455, 456. The input circuit of the amplifier 451 is arranged as shown in FIG. 15, the remainder of the circuit being shown in FIG. 14.

Finally, referring to the second derivative channel, the gain changer 354 therein is for the purpose of increasing the gain for low signal values. Consequently its circuit is the same as for the gain changer 334 described immediately above and corresponding reference numerals, 20 units greater, are used to designate corresponding parts.

The operation of the circuits 334, 354 will be apparent to one skilled in the art. It will suffice to say that both inputs to the magnetic amplifiers 451, 471 are effective when the signal is low resulting in a higher gain condition for low signal values. However, when the signal is high the rectifiers are conductive, effectively shorting one input to ground. Thus only the remaining input is effective and the gain, in the face of a high signal, is automatically reduced to a lower value. The problem of adjusting the circuit to obtain two predetermined values of gain and determining the changeover of break point is taken care of as incident to the following adjustment procedure.

*Procedure for Adjusting the Electromagnetic Governor Having Integral Gain Changers*

The procedure for adjusting of the resistors in the circuit of FIG. 19 is largely analogous to that which has previously been described in connection with FIG. 13. The first step is to ascertain the coefficients in the following linear control function:

$$C\Sigma = Cx + CA_1 x' + CA_2 x'' \qquad (77)$$

The three coefficients for linear operation are, respectively, C, $CA_1$ and $CA_2$. These are obtained as in the case of the electronic governor and repetition is unnecessary. The circuit is then adjusted to produce such coefficients with the nonlinear channel disconnected. Disconnection is effected by breaking the circuit at the input of the absquaring resistor 380. The gain changers are left in the circuit, since they form an integral part thereof. However, the gain-changing function is eliminated by opening the connections 453, 473 in gain changers 334, 354, and by disconnecting the rectifiers 427, 428 in gain changer 304. This causes the gain changers to assume their "low signal" conditions of operation.

Each of the coefficients may be set forth in terms of the circuit constants in the particular channel, thus $$C = \left(\frac{\mu_{421} R_{422}}{R_{420}+R_{422}}\right)\left(\frac{\mu_{431} R_{432}}{R_{426}+R_{429}+R_{432}}\right)\left(\frac{\mu_{305} R_{311}}{R_{303}+R_{311}}\right) \qquad (78)$$

$$CA_1 = \mu_{322} R_{323} C_{321}\left(\frac{\mu_{441} R_{442}}{R_{440}+R_{442}}\right)\left(\frac{\mu_{451} R_{452}}{R_{450}+R_{452}}\right)\left(\frac{\mu_{305} R_{312}}{R_{333}+R_{312}}\right) \qquad (79)$$

$$CA_2 = (\mu_{322} R_{323} C_{321})(\mu_{342} R_{343} C_{341})\left(\frac{\mu_{461} R_{462}}{R_{460}+R_{462}}\right)\left(\frac{\mu_{471} R_{472}}{R_{470}+R_{472}}\right)\left(\frac{\mu_{305} R_{313}}{R_{353}+R_{313}}\right) \qquad (80)$$

The capacitors 321, 341 may be assigned values of 100 mf. It is assumed that the input resistances and amplification factors of the various magnetic amplifiers are known. The remaining resistors may then be chosen so as to obtain the correct computed coefficients. After such resistors are adjusted the circuit may be put into operation and the system should operate stably for small disturbances.

With the system in operation, the high derivative portion of the nonlinear channel is put into operation by connecting the nonlinear resistor 380, and by opening the low derivative input connection 361 in the magnetic amplifier 360. Starting with a high value, the resistance of the resistor 371 is gradually decreased until the maximum tolerable jiggle in the pilot valve is obtained. This determines the value of resistor 371 for design nonlinear operation, and also enables the gain constant c for nonlinear operation to be ascertained by the procedure which follows.

The complete control function for nonlinear operation is $$c\Sigma = x + ca_1 x' + ca_2 x'' + cb \text{ absquare } [x' + a_1 x''] \qquad (81)$$

The coefficients $a_1$, $a_2$ and $b$ have been previously determined from the characteristics of the system to be controlled. Each of these coefficients may be expressed in terms of the circuit constants which affect it, so that the control function becomes $$c\Sigma = \left(\frac{\mu_{421} R_{422}}{R_{420}+R_{422}}\right)\left(\frac{\mu_{431} R_{432}}{R_{426}+R_{429}+R_{432}}\right)\left(\frac{\mu_{305} R_{311}}{R_{303}+R_{311}}\right)x$$
$$+ (\mu_{322} R_{323} C_{321})\left(\frac{\mu_{441} R_{442}}{R_{440}+R_{442}}\right)\left(\frac{\mu_{451} R_{452}}{R_{450}+R_{452}}\right)\left(\frac{\mu_{305} R_{312}}{R_{333}+R_{312}}\right)x'$$
$$+ (\mu_{322} R_{323} C_{321})(\mu_{342} R_{343} C_{341})\left(\frac{\mu_{461} R_{462}}{R_{460}+R_{462}}\right)\left(\frac{\mu_{471} R_{472}}{R_{470}+R_{472}}\right)$$
$$\left(\frac{\mu_{305} R_{313}}{R_{353}+R_{313}}\right)x'' + k_\text{a} \text{ absquare }\left[\mu_{322} R_{323} C_{321}\left(\frac{\mu_{300} R_{361}}{R_{320}+R_{361}}\right)x'\right.$$
$$\left.+ \mu_{322} R_{323} C_{321} \mu_{342} R_{343} C_{341} \frac{\mu_{360} R_{362}}{R_{371}+R_{362}}\right]x'' \qquad (82)$$

In this expression $k_\text{a}$ is the constant of the absquaring resistor 380 and its associate channel 314 in amplifier 305 and is ascertained as described in the preceding section.

The nonlinear portion of the expression (82) may be simplified by factoring to give $$k_a = \left(\frac{\mu_{322}R_{323}C_{321}\mu_{360}R_{361}}{R_{320}+R_{361}}\right)^2 \text{absquare}$$

$$\left[x' + \frac{\mu_{342}R_{343}C_{341}R_{362}(R_{320}+R_{361})}{(R_{371}+R_{362})R_{361}}\right]x'' \quad (83)$$

Comparing expressions (81) and (83), it will be seen that $$a_1 = \frac{\mu_{342}R_{343}C_{341}R_{362}(R_{320}+R_{361})}{(R_{371}+R_{362})R_{361}} \quad (84)$$

and that $$cb = k_a\left(\frac{\mu_{322}R_{323}C_{321}\mu_{360}R_{361}}{R_{320}+R_{361}}\right)^2 \quad (85)$$

From expression (84) the resistance of resistor 320 may be numerically determined, permitting the gain constant $c$ to be solved for in expression (85).

The next step is to set the components in the $x$, $x'$ and $x''$ channels to produce the proper coefficients for both low signal and high signal operation. For low signal operation about the origin, the coefficients $C$, $CA_1$ and $CA_2$ are applicable, while for high signal operation the coefficients $c$, $ca_1$ and $ca_2$ are applicable.

*Setting the Circuit Constants in the Deviation Channel*

Turning to the deviation or $x$ channel in FIG. 19 which includes the gain changer 304, the coefficient of the $x$ term is $$\left(\frac{\mu_{421}R_{422}}{R_{420}+R_{422}}\right)\left(\frac{\mu_{431}R_{432}}{\frac{R_{426}R_s}{R_{426}+R_s}+R_{429}+R_{432}}\right)\left(\frac{\mu_{305}R_{311}}{R_{303}+R_{311}}\right) \quad (86)$$

where $R_s$ is the net resistance of the rectifiers. When the signal in this channel is large, $R_s$ becomes small, so that the coefficient is given by $$c = \left(\frac{\mu_{421}R_{422}}{R_{420}+R_{422}}\right)\left(\frac{\mu_{431}R_{432}}{R_{429}+R_{432}}\right)\left(\frac{\mu_{305}R_{311}}{R_{303}+R_{311}}\right) \quad (87)$$

Conversely, when the signal is small, $R_s$ becomes large, so that the coefficient becomes $$C = \left(\frac{\mu_{421}R_{422}}{R_{420}+R_{422}}\right)\left(\frac{\mu_{431}R_{432}}{R_{426}+R_{429}+R_{432}}\right)\left(\frac{\mu_{305}R_{311}}{R_{303}+R_{311}}\right) \quad (88)$$

The break point occurs at a place where $c$ changes to $C$.

It will be noted that the expressions for $c$ in (87) and $C$ in (88) differ only in one of their three terms. Thus, to simplify the expressions we may let the product of the common terms be 1, thus $$\left(\frac{\mu_{421}R_{422}}{R_{420}+R_{422}}\right)\left(\frac{\mu_{305}R_{311}}{R_{303}+R_{311}}\right) = 1 \quad (89)$$

Values of $R_{420}$ and $R_{303}$ are chosen so that this condition obtains. Therefore expression (87) becomes $$c = \frac{\mu_{431}R_{432}}{R_{429}+R_{432}} \quad (90)$$

enabling a numerical value to be found for $R_{429}$, and (88) becomes $$C = \frac{\mu_{431}R_{432}}{R_{426}+R_{429}+R_{432}} \quad (91)$$

from which $R_{426}$ may be determined.

Such values of resistance establish the two gain conditions, but do not determine the point of change or break point. The latter may be set by varying resistors 420 and 303 relative to one another while maintaining the equality set forth in expression (89). To move the break point closer to zero, $R_{420}$ should be reduced while $R_{303}$ is increased. As an initial approximation, the break point should be set so that it is about 1% of the maximum signal in the deviation channel, corresponding to a low signal band of 2%. Later, after the system is in operation, a trimming adjustment is made to insure that the break point is as close to zero input voltage as possible.

*Setting the Circuit Constants in First Derivative Channel.*

Attention is next given to the gain changer 334 in the $x'$ channel. The circuit is as shown in FIG. 19. The $x'$ term has a coefficient $ca_1$ for nonlinear control and $CA_1$ for linear control, where $$ca_1 = (\mu_{322}R_{323}C_{321})\left(\frac{\mu_{441}R_{442}}{R_{440}+R_{442}}\right)\left(\frac{\mu_{451}R_{452}}{R_{450}+R_{452}}\right)\left(\frac{\mu_{305}R_{312}}{R_{333}+R_{312}}\right) \quad (92)$$

and $$CA_1 = \mu_{322}R_{323}C_{321}\left(\frac{\mu_{441}R_{442}}{R_{440}+R_{442}}\right)\left(\frac{\mu_{451}R_{452}}{R_{450}+R_{452}}+\frac{\mu_{451}R_{453}}{R_{446}+R_{447}+R_{453}}\right)$$

$$\left(\frac{\mu_{305}R_{312}}{R_{333}+R_{312}}\right) \quad (93)$$

The procedure for setting the resistors is analogous to that described immediately above. The product of common terms is set equal to 1, thus $$\left(\frac{\mu_{441}R_{442}}{R_{440}+R_{442}}\right)\left(\frac{\mu_{305}R_{312}}{R_{333}+R_{312}}\right) = 1 \quad (94)$$

Accordingly $$ca_1 = \mu_{322}R_{323}C_{321}\left(\frac{\mu_{451}R_{452}}{R_{450}+R_{452}}\right) \quad (95)$$

The only unknown in this expression is resistor 450, which may be numerically determined. From (93) and (94), it also follows that $$CA_1 = \mu_{322}R_{323}C_{321}\left(\frac{\mu_{451}R_{452}}{R_{450}+R_{452}}+\frac{\mu_{451}R_{453}}{R_{446}+R_{447}+R_{453}}\right) \quad (96)$$

The only unknown in this expression is $(R_{446}+R_{447})$, which may be numerically determined.

The break point is next adjusted to a point which is approximately 5% of the maximum value of the first derivative, corresponding to a low signal band of 10% by adjusting resistors 440 and 333 relative to one another, maintaining the relation set forth in expression 94.

*Setting the Circuit Constants in Second Derivative Channel*

Finally, we turn to the gain changer 354, which serves to vary the gain in the second derivative channel, the circuit of which is set forth in FIG. 19. For nonlinear control, the second derivative channel has a coefficient of $ca_2$, while for linear control the coefficient becomes $CA_2$. Both of these coefficients may be set forth in terms of the circuit constants which affect them. Thus, under high signal conditions $$ca_2 = \mu_{322}R_{323}C_{321}\mu_{342}R_{343}C_{341}\left(\frac{\mu_{461}R_{462}}{R_{460}+R_{462}}\right)$$

$$\left(\frac{\mu_{471}R_{472}}{R_{470}+R_{472}}\right)\left(\frac{\mu_{305}R_{313}}{R_{353}+R_{313}}\right) \quad (97)$$

When the signal is small, $$CA_2 = \mu_{322}R_{323}C_{321}\mu_{342}R_{343}C_{341}\left(\frac{\mu_{461}R_{462}}{R_{460}+R_{462}}\right)$$

$$\left(\frac{\mu_{471}R_{472}}{R_{470}+R_{472}}+\frac{\mu_{471}R_{473}}{R_{466}+R_{467}+R_{473}}\right)\left(\frac{\mu_{305}R_{313}}{R_{353}+R_{313}}\right) \quad (98)$$

Just as in the $x$ and $x'$ channels, common terms are set equal to 1, thus $$\left(\frac{\mu_{461}R_{462}}{R_{460}R_{462}}\right)\left(\frac{\mu_{305}R_{313}}{R_{353}R_{313}}\right) = 1 \quad (99)$$

It follows from (97) that $$ca_2 = \mu_{322} R_{323} C_{321} \mu_{342} R_{343} C_{341} \left( \frac{\mu_{471} R_{472}}{R_{470}+R_{472}} \right) \quad (100)$$

and from (98) that $$CA_2 = \mu_{322} R_{323} C_{321} \mu_{342} R_{343} C_{341} \left( \frac{\mu_{471} R_{472}}{R_{470}+R_{472}} + \frac{\mu_{471} R_{473}}{R_{66}+R_{467}+R_{473}} \right) \quad (101)$$

$R_{470}$ is the only unknown in expression (100) and may be numerically determined. Following this, expression (101) may be solved to obtain $R_{466}+R_{467}$. The break point is initially adjusted to a point which is about 5% of maximum, corresponding to a low signal input band width, by varying resistors 460 and 353, while maintaining the relationship set forth in expression (99). This completes the setting of the resistors in the second derivative channel for design nonlinear control, with linear control at low signal values.

Limiter Used in Electromagnetic Governor

The motor operator 76a in FIG. 13 differs from that shown at 76 in FIG. 1 in that it does not include a cathode follower stage, and limiting is provided by the special limiting circuit indicated at 390 and disclosed in detail in FIG. 18. The limiting circuit is so arranged that the overall response characteristic is the same as that set forth in FIG. 3a. That is to say, the speed of the output servo and its connected throttle rises linearly at a relatively high rate as a function of the control signal, and levels off at a point below that at which the pilot valve will strike its stops, with the result that the pilot valve winding is protected against over-current and hammering of the stops is minimized.

As shown in FIG. 18, the limiter 390 includes a first magnetic amplifier 481 having an input resistor 480, input terminals 482, 483 and output terminals 484, 485. Connected to the output terminals is a series resistor 486, which is in turn connected to a pair of oppositely poled rectifiers 487, 488. The rectifiers feed a second magnetic amplifier 491 having an input resistor 490 and terminals 492-495. The output terminals are connected directly to the coil 176 which operates the servo pilot valve.

The circuit of the magnetic amplifiers and the characteristics of the rectifiers are the same as those used in the gain changers previously discussed. The rectifiers preferably have a break point in their characteristic at 0.4 volt, the resistance rapidly dropping to zero beyond such voltage. Assuming that the resistance of the input circuit of magnetic amplifier 491 is substantially higher than the rectifier break point resistance, it will be apparent that a large proportion of current will be simply shunted to ground under high signal conditions. For this reason resistor 490 and the input resistance of the magnetic amplifier 491 are chosen to be approximately 100 ohms. Resistor 486 is also chosen to be 100 ohms in order to limit loading at the output of the magnetic amplifier 481.

At the break point (0.4 volt) where limiting begins, the output voltage of the magnetic amplifier 491 is given by the following expression:

$$\left( \frac{\mu_{491} R_{492}}{R_{490}+R_{492}} \right)(0.4) = i_{176} R_{176} \quad (102)$$

In the above, $i_{176}$ is the current through the pilot valve coil 176 and has a known value lying just below that which would cause the pilot valve to hit its stops. Thus, the only unknown is $R_{490}$, which can be numerically determined. Setting the resistor 490 at such value determines the limit condition, but further adjustment is necessary in order to produce an overall gain or slope of unity. The latter is necessary so that the $c\Sigma$ signal is unchanged when passing through the limiter and when below the limit value.

Prior to adjusting the slope, the existing slope is measured by applying a voltage at $e_t$ and plotting the output voltage $e_o$. The slope $m$ of the resulting curve is measured. In order to bring the slope up or down to a value of unity, the magnetic amplifier 481 comes into play, and is adjusted so that the following relationship is obtained:

$$\frac{\mu_{481} R_{482}}{R_{480}+R_{482}}(m) = 1 \quad (103)$$

In this expression the only unknown is $R_{480}$, which may be numerically determined and which gives a setting for the resistor 480. This results in the limiter characteristic curve shown in FIG. 18a having a slope of unity and with current limited to a safe value. The overall characteristic of the motor operator 76a is the same as that shown in FIG. 3 for the electronic version.

MECHANICAL NONLINEAR GOVERNOR

In the preceding sections electronic and electromagnetic versions of the present nonlinear governor have been described in detail. It will be appreciated, however, by one skilled in the art, that my invention is not limited thereto, but may be embodied with equal advantage in mechanical governing devices. I have set forth in FIG. 20 a representative mechanical governor which embodies the invention, with the component parts thereof laid out in a two-dimensional arrangement, for the sake of simplicity and ready understanding. It will be understood, of course, that in a practical device the parts may be arranged in three dimensions for greater compactness and practicability.

The device shown in FIG. 20 operates in accordance with a control function having the following form:

$$c\Sigma = cx + ca_1 x' + cb \text{ absquare } [x'] \quad (104)$$

where $\Sigma$ is the control function, $x$ is the deviation, $x'$ is the first derivative of such deviation, and $a_1$, $b$ and $c$ are coefficients. The coefficient $a_1$ is defined as the sum of the time lags of the system, the coefficient $b$ is defined as the inverse of the product of twice the gain of the system and the maximum servo speed, and $c$ is defined as the overall gain coefficient.

As will be more fully described as the discussion proceeds, means are included in the mechanical governor for changing the gain, i.e., varying the coefficients, for low signal values.

Turning now to FIG. 20, the engine 30 has a throttle 31. The engine is mechanically coupled, as indicated, to a speed-measuring device 500 of the fly ball type. The engine is also mechanically coupled to an acceleration measuring device 501 having an output element 502, the position of which varies directly in accordance with the engine acceleration. The acceleration-measuring device may be of any convenient type and may, for example, take the form of that shown in André Tenot, Turbine Hydrauliques, Livre IV, Paris, Librairie de l'Enseignement Technique, 3 Rue Thénard, 1935, page 146.

The speed-measuring device 500, which is shown diagrammatically, includes an output element 503, the position of which varies in accordance with the speed of the engine. It will suffice to say that the fly balls 504 are rotatably mounted for effecting compression of a spring 505. The spring 505 is nonlinear so that the setting of the output element varies linearly with speed.

For the purpose of isolating the speed-measuring device from the remainder of the system, the output element 503 thereof is applied to the input of an hydraulic amplifier or servo 510. Such servo includes an input element 511, and output element 512, and a feed-back link 513. The input element 511 in the present instance is in the form of a pilot valve having a source of fluid pressure 514 and which applies pressure to the opposite sides of a piston 515 on the output element 512. It will be apparent to one skilled in the art that the position of the output element 512 varies in magnitude and direction in accordance with the positioning of the input element 511.

As a result the output element may be called upon to do a substantial amount of work in overcoming frictional forces or the like without affecting the accuracy of the speed-measuring device 500.

The setting of the servo output element 512 is a measure of the deviation signal which is fed via additional linkage to a final hydraulic servo device 520, having an input element 521, a source of pressure fluid 523, and an output element 522, the output element being coupled to the engine throttle as shown.

As to the linkage in the deviation channel, means are interposed between the servo 510 and the servo 520 for changing the gain of the channel in accordance with the magnitude of the deviation signal. Such gain-changing means includes a mechanism having a single input member and two output members which are moved selectively depending upon whether the input signal is above or below a predetermined value. In the present instance the mechanism employs a fulcrum plate 525 having a pivoted input lever 526 which is pivoted to the plate at a pivot point 527. The transfer plate itself is bodily pivoted on a pivot 528 (see FIG. 21). Such pivot is vertically alined with pivot 529 at the left-hand end of the lever 526. Extending downwardly from the pivot 529 is a first output link 531.

In accordance with one of the mode detailed aspects of the invention, the transfer plate 525 is centrally positioned by a detent mechanism 533 having a low scale spring 534. Thus, for small deviations endwise movement of the servo element 512 causes corresponding endwise movement of the first output link 531. The link 531 is connected at its lowermost end to a multiplying mechanism 540 having a radius link 541 and an output link 542, the link 541 having one end guided in an arcuate path by a guide 543. The output link 542 of the multiplier mechanism is connected to a bell crank 544, a vertical link 545, a horizontal link 546, and another vertical link 547. The lower end of the link 547 is connected to the left-hand end of an output link 548, which latter is connected to the input element of the servo 520, as shown. It will be appreciated by one skilled in the art that any small changes in the speed of the engine result in movement of the element 503 in the speed-measuring device, which, acting through the servo 510 result in movement of the output servo 520 and corrective action of the engine throttle.

In carrying out the invention, the transfer plate is provided with stops 549, 550 arranged in the path of movement of the input lever 526 and carries a second output link 551 which is displaced in accordance with bodily movement of the plate. In operation, striking of either one of the stops 549, 550 by the lever 526 causes bodily pivoting of the plate 525 about its central pivot 528, resulting in endwise movement of the second output link 551 without corresponding movement of the first output link 531. The movement of the second output link results in movement of a multiplying mechanism 560 having a radius link 561, and an output link 562, the radius link being connected to a guide member 563. The output link 562 of the multiplying mechanism is connected to a bell crank 564, which in turn operates a vertical link 565, which is coupled to the output lever 548.

It will be seen from the foregoing that any large change in engine speed beyond the limits set by the stops 549, 550 is accompanied by movement of the input element 521 in the servo 520. Because of the change in lever arm brought about by action of the transfer plate 525, large changes in speed affect the output servo 520 to a different degree, proportionally speaking, than small changes.

Attention may next be given to the first derivative channel, which begins in the acceleration-measuring device 501, and which terminates at the right-hand end of the output lever 548. As stated above, the output element 502 of the acceleration-measuring device assumes a position which is dependent upon the magnitude of the engine acceleration. The setting is fed into a hydraulic amplifier or servo 570 having an input element 571, an output element 572 and an interconnecting lever 573. The servo is fed from a source of pressure fluid 574, which is fed to one side or the other of a piston 575 on the output element. Thus, as in the case of the servo 510 previously referred to, the output element assumes a position which depends upon the direction and magnitude of the acceleration, and the accuracy of the aceleration device is unaffected by the loading, frictional or otherwise, imposed by the mechanism which it controls.

Means are provided in the acceleration channel for changing the gain, depending upon whether the first derivative signal is small or large. The device for accomplishing this is a mirror image of that shown in FIG. 21 in connection with the deviation channel. A transfer plate 585 is provided having an input lever 586 pivoted at a point 587. The plate is bodily pivoted at a pivot 588, which is vertically alined with a pivot 589 on the input lever 586. Extending downwardly from the pivot 589 is a first output link 591.

The transfer plate 585 is maintained in a central position by means of a detent mechanism 593; and stops 594, 595 are provided in the path of movement of the input lever 586.

Continuing the tracing of the linkage, the output lever 591 is connected to a multiplying device 600 having a radius lever 601 and an output lever 602, the radius lever being connected to a guide member 603 for arcuate movement. The output lever 602 of the mutiplying device is connected to a bell crank 604, a vertical link 605, a horizontal link 606, another vertical link 607, a final horizontal link 608 and a final vertical link 509.

Coupled to the right-hand end of transfer plate 585 is a second output link 611, which is moved endwise for large amounts of acceleration, i.e., whenever the input lever 586 strikes one of the stops 594, 595. The bottom end of the link 611 is connected to a multiplying device 620 having a radius link 621, an output link 622, and a guide 623 for guiding the radius link in an arcuate path. The output link 622 of the multiplying device is connected to a bell crank 624, which feeds a vertical link 625. The latter terminates in a connection with the horizontal lever 606 previously referred to. As a result of the linkage just described, both large changes and small changes in acceleration result in repositioning of the output lever 548, but to a proportionally different degree.

In carrying out the invention, means are further provided for deriving a nonlinear term which varies as the absquare of the first derivative signal. The absquare function is obtained in the present instance by means of a cam follower 631. The cam 630 is rotated by a pinion 632 which engages a rack 633 at the output of the servo 570. The cam is so formed that the displacement of the cam follower 631 varies in accordance with the absquare of the first derivative; that is to say, the displacement of the cam follower 631 increases as the square of the acceleration, but preserves the sign of the acceleration, whether positive or negative.

For the purpose of transmitting the absquare function to the output servo 520, appropriate linkage is provided. This linkage includes a bell crank 634, a vertical link 635 and a multiplying mechanism 640. The latter is made up of a radius link 641 and an output link 642, the radius link having a guide member 643 for guiding it in an arcuate path. The output member 642 is connected to a bell crank 644, which is in turn connected to a vertical link 645. The latter is coupled to the horizontal lever 608 which was referred to in connection with the first derivative channel. It will be apparent that any change in acceleration causes a repositioning of the output lever in accordance with both the linear and absquare functions.

*Multiplying Device*

Prior to further discussion of the mechanical governor shown in FIG. 20, more specific attention will be given to the multiplying devices used therein, with particular reference to the multiplying device 540. The multiplying device 540 has been set forth in FIG. 22, with the elements somewhat enlarged and with the geometrical relations indicated thereon. The radius lever 541 has a pivot 541a at its left-hand end and a pivot 541b at its right-hand end. The guide member 543 rides on the surface 543a, which is so formed that the radius link 541 describes an arc about the pivot 541a. The output link 542 has a pivot 542a, which is guided for horizontal movement. From geometrical considerations, where each of the links has a length 1, it can be shown that $$\frac{x_3}{x_1} = \frac{x_2}{0.9321}$$

where $x_1$ and $x_2$ are the input quantities, and where $x_3$ is the output, all as indicated in FIG. 22. This expression holds with a satisfactory degree of accuracy provided that $x_3$ is maintained within the range of 0 to $\frac{1}{10}$.

The multiplying devices may for convenience be constructed as shown in FIG. 23 in which the member 543 is omitted, the lever 541 being guided instead by a guide lever 541c having a knob 541d.

*Adjustment of Mechanical Nonlinear Governor*

The mechanical nonlinear governor shown in FIG. 20 is adjusted using a procedure which is analogous to that employed for adjusting the electronic and electromagnetic versions. Thus, the governor is first set up for linear control using coefficients obtained in the conventional way. A nonlinear signal component is then injected, the amount being increased until cycling about the control point becomes objectionable. This determines the overall gain coefficient. Having knowledge of such coefficient, and knowing the characteristics of the system to be controlled, coefficients are then ascertained for design nonlinear control and the control elements are correspondingly set.

The control function for linear control (FIG. 20) is $$C\Sigma = Cx + CAx' \quad (105)$$

It will be assumed that the numerical values of the coefficient C and CA are known, having been ascertained, for example, by the procedure set forth in the discussion of the electronic version of the governor.

In setting up the system for linear control, the stops on the fulcrum plates 525, 585 are backed all the way off. The radius link of the multiplier 640 in the nonlinear chanel is swung downwardly to the zero point with the links 641 and 642 in alinement with one another. Adjustment of the deviation channel coefficient C may now be effected by adjusting the multiplier 540, and the adjustment of the first derivative channel coefficient CA may be effected by adjusting the multiplier 600. The coefficients are not only determined by the adjustments of the multiplying device, but also by the constants of the measuring devices and the multiplying ratios of the levers in the particular channel. It will be apparent that when the overall multiplying factor of the channel, exclusive of the multiplying device, is known, then the multiplying device may be calibrated directly in terms of the channel coefficient.

This will be made clear by setting up an expression for linear operation which includes all of the multiplying factors which apply to the system of FIG. 20. During linear operation the control function $C\Sigma$ of expression (105) is expressed by the following:

$$C\Sigma = k_{540}k_{500}\frac{B}{A}\frac{D}{C}\left(\frac{H}{G+H}\right)\left(\frac{J}{I+J}\right)x$$
$$+ k_{600}k_{501}\frac{L}{K}\frac{N}{M}\left(\frac{R}{Q+R}\right)\left(\frac{S}{T+S}\right)\left(\frac{I}{J+I}\right)x' \quad (106)$$

in which $k_{540}$ = the ratio of the multiplying device 540,
$k_{500}$ = proportionality constant of the speed-measuring device 500,
$k_{600}$ = the ratio of the multiplying device 600,
$k_{501}$ = the proportionality constant of the acceleration-measuring device 501, and the remaining quantities are the lever lengths shown in FIG. 20.

The multiplying devices 540 and 600 preserve accuracy only when used over a ratio of between zero and $\frac{1}{10}$. Consequently, other ones of the levers in the system are tailored so that $$k_{500}\frac{B}{A}\frac{D}{C}\left(\frac{R}{G+R}\right)\left(\frac{J}{I+J}\right) \quad (107)$$

is equal to or greater than 10C and $$k_{501}\frac{L}{K}\frac{N}{M}\left(\frac{R}{Q+R}\right)\left(\frac{S}{T+S}\right)\left(\frac{I}{J+I}\right) \quad (108)$$

is equal to or greater than 10CA. The latter tailoring is simply a matter of design which permits multiplying devices 540, 600 to be calibrated to read directly in terms of C and CA, respectively. The only unknowns in expressions (105) and (106) are the actual settings of the devices 540, 600 which may be calculated. With the multiplying devices set at the settings thus ascertained, the system may be started and should operate stably about the control point. A trimming adjustment may be made in settings of the multiplying devices 540, 600 with the system in operation, in order further to improve the stability of linear control.

With the system operating stably, a gradually increasing amount of nonlinear component is added until the jiggle of the throttle is the maximum which may be tolerated as covered below. This enables computation of the overall gain coefficient c for design nonlinear control. Prior to carrying out the foregoing, note that the nonlinear control function of the system of FIG. 20 is as follows:

$$c\Sigma = cx + ca_1x' + cb \text{ absquare } [x'], \quad (109)$$

the coefficients being defined the same as in preceding sections. The absquare coefficient $cb$ may be expressed in terms of the quantities which affect it, as follows:

$$cb = k_{640}k_{630}\left(k_{501}\frac{L}{K}\right)^2\left(\frac{T}{S+T}\right)\left(\frac{I}{J+I}\right) \quad (110)$$

where $k_{640}$ equals the ratio of the multiplying device 640 and $k_{630}$ equals the multiplying coefficient of the cam 630 relative to the pinion 632. Since the only unknowns in expression (110) are $cb$ and $k_{640}$, it will be apparent that the multiplying device 640 may be directly calibrated in terms of $cb$. In calibrating the device 640 the parameters other than $k_{640}$ should be such that the device is not called upon to exceed its accurate nominal range of 0 to 0.1. Having set the device 640 at its jiggle point, $cb$ may be read off directly from it. Since $b$ is know by definition from the characteristics of the system to be controlled, $c$ may be numerically determined.

Knowning $c$, an expression may be set up for $c$ for nonlinear control, as follows:

$$c = k_{560}k_{500}\left(\frac{B}{A}\right)\left(\frac{F}{E}\right)\left(\frac{G}{H+G}\right)\left(\frac{J}{I+J}\right) \quad (111)$$

where $k_{560}$ is the ratio of the multiplying device 560, where $k_{500}$ is the proportionality constant of the speed-measuring device 500, and where the product of all of the parameters except $k_{560}$ is greater than or equal to 10C. The only unknown is $k_{560}$ which may be numerically determined, the multiplying device 560 being set to a corresponding setting.

Then in similar fashion, an expression may be set up.

for the coefficient of the high signal first derivative channel, as follows:

$$ca_1 = k_{620}k_{501}\frac{L}{K}\frac{P}{O}\left(\frac{Q}{R+Q}\right)\left(\frac{S}{T+S}\right)\left(\frac{I}{I+J}\right)$$

(112)

where $k_{620}$ is the ratio of the multiplying device 620, where $k_{501}$ is the proportionally constant of the acceleration-measuring device, and assuming that the product of the parameters exclusive of $k_{620}$ is equal to or greater than $10ca_1$. Knowing $a_1$ by definition, the only unknown is $k_{620}$, which may then be numerically ascertained and the device 620 adjusted to a corresponding setting.

The system may then be started. It should operate stably since the adjustable stops on the fulcrum plates are backed all the way off, making the control essentially linear. The system will probably not operate satisfactorily for large changes in loading, however. For design nonlinear control, it is necessary to take up on the adjustable stops to narrow down the linear band as much as possible. The stops are adjusted alternately and in pairs until a point is reached where further reduction in the setting of either pair will give rise to objectionable cycling of the speed about the control point when the load is increased or decreased a moderate amount. This should complete the adjustment for design linear control.

If desired to confirm the correctness of all of the adjustments which have been made, the speed transient upon making a sudden change in load, should appear on an oscillograph as shown in FIG. 24. If the trace appears as shown in FIG. 25 or FIG. 26, a trimming adjustment should be made in the settings of multiplier devices 560 and 620 to produce the desired form of transient.

For ease of understanding, the present invention has been described in connection with automatic speed control. It will be apparent to one skilled in the art that the invention is not limited to speed control but is equally applicable to the control of other variables, requiring only that (1) means, analogous to the tachometer, be provided for continuously measuring the controlled variable and that (2) means, analogous to the throttle, be connected to the final control element for varying the manipulated variable.

In the claims which follow, reference to the first derivative is not intended to be exclusive, and the claims will be understood to cover systems in which additional means are provided for producing higher order derivatives. The term "absquare" shall be understood to cover, in addition to the theoretical absquare function, the nonlinear functions characteristic of practical nonlinear resistors and the like having characteristics which are generally parabolic in shape when used as described herein.

What I claim is:

1. A governor for an engine or the like having a speed control element comprising, in combination, a speed-sensing element having an output, a deviation channel coupled to said output and having means for producing a signal representative of the deviation of the speed from a control point, a first derivative channel coupled to said output and having means for producing a signal representative of the first derivative of the deviation, an absquare channel coupled to said output and having means for producing an absquare signal in accordance with the absquare function of said first derivative signal, means for combining the signal from the absquare channel with at least the signal from the deviation channel to form a continuously variable net control signal, and motor operator means connected to the combining means and linearly responsive to the control signal but saturable by the latter when it exceeds predetermined values for correctively operating upon said speed control element to restore the speed to the control point.

2. A governor for an engine or the like having a speed control element comprising, in combination, a speed-sensing element having an output, a derivative channel coupled to said output and having means for producing a signal representative of the deviation of the speed from a control point, a first derivative channel coupled to said output and having means for producing a signal representative of the first derivative of such deviation, an absquare channel coupled to said output and having means for generating an absquare signal in accordance with the absquare function of said first derivative signal, means for combining said absquare signal with at least said deviation signal to form a continuously variable net control signal, at least one of said channels having means for automatically changing the gain thereof, and motor operator means connected to the combining means and linearly responsive to the net control signal but saturable by the latter when it exceeds predetermined values for correctively operating upon said speed control element to restore the speed to said control point.

3. A governor for an engine or the like having a speed control element comprising, in combination, a speed-sensing element having an output, a deviation channel coupled to said output and having means for producing a signal representative of the deviation of the speed from a control point, a first derivative channel coupled to said output and having means for producing a signal representative of the first derivative of the deviation, an absquare channel coupled to said output and having means for producing an absquare signal in accordance with the absquare function of said first derivative signal, means for combining the signal from the absquare channel with at least the signal from the deviation channel to form a continuously variable control signal, and motor operator means connected to the combining means and linearly responsive to the control signal but saturable by the latter when it exceeds predetermined values for correctively operating upon said speed control element to restore the speed to the control point, at least one of said channels having means for effectively varying the gain of the signal in such channel automatically in response to the magnitude thereof to reduce the relative effectiveness of the absquare signal for small speed disturbances in the region of the control point.

4. A governor for an engine or the like having a speed control element comprising, in combination, a speed-sensing element having an output, means including a signal adder for producing a continuously variable net control signal, a deviation channel coupled to said output and having means for producing a deviation signal representative of the deviation of the speed from a control point, a first derivative channel coupled to said output and having means for producing a derivative signal representative of the first derivative of the deviation, an absquare channel coupled to said output and having means for producing an absquare signal in accordance with the absquare function of said first derivative signal, said channels being coupled to said adder, and motor operator means linearly responsive to the net control signal but saturable by the latter when it exceeds predetermined values for correctively operating upon said speed control element to restore the speed to the control point, at least one of said channels having means for increasing the effective gain of the first derivative channel automatically for small speed disturbances in the region of the control point.

5. A governor for an engine or the like having a speed control element comprising, in combination, speed-sensing means for producing at its output a signal representative of the deviation of the speed from a control point, differentiating means coupled to said output for producing a signal representative of the first derivative of such deviation, means coupled to said differentiating means and responsive to the first derivative signal for generating an absquare signal in accordance with the absquare function of said first derivative signal, means for combining said absquare signal with at least the deviation signal to form a continuously variable control signal, and a motor operator coupled to the combining means and linearly responsive to the control signal therein but saturable by the latter when it exceeds predetermined values for correctively operating upon said speed control element to restore the speed to said control point, at least one of said means including means for reducing the relative effectiveness of the absquare signal component in the region of the control point.

6. A governor for an engine or the like having a speed control element comprising, in combination, a speed-sensing element having an output, a deviation channel coupled to said output and having means for producing a signal representative of the deviation of the speed from a control point, a first derivative channel coupled to said output and having means for producing a signal representative of the first derivative of the deviation, an absquare channel coupled to said output and having means for producing an absquare signal in accordance with the absquare function of said first derivative signal, means for combining the signal from the absquare channel with at least the signal from the deviation channel to form a continuously variable net control signal, and motor operator means connected to the combining means and linearly responsive to the control signal therein but saturable by the latter when it exceeds predetermined values for correctively operating upon said speed control element to restore the speed to the control point, said motor operator means having a movable output element and having an input element proportionally positionable between limits in response to said net control signal to control the speed of displacement of the output element.

7. A governor for an engine or the like having a speed control element comprising, in combination, a speed-sensing element having an output, a deviation channel coupled to said output and having means for producing a signal representative of the deviation speed from a control point, a first derivative channel coupled to said output and having means for producing a signal representative of the first derivative of the deviation, an absquare channel coupled to said output and having means for producing an absquare signal in accordance with the absquare function of said first derivative signal, means including an adder for algebraically adding the signal from the absquare channel with at least the signal from the deviation channel to form a continuously variable control signal, and a motor operator, said motor operator having a movable output member coupled to said speed control element for positioning the same and having an input member coupled to said adder and so arranged that the speed of the output member varies linearly with the magnitude of the control signal but saturates when the control signal exceeds predetermined values.

8. A governor for an engine or the like having a speed control element comprising, in combination, means for producing a signal representative of the deviation of the speed from a control point, differentiating means for producing a signal representative of the first derivative of such deviation, means coupled to the differentiating means and responsive to the first derivative signal for generating an absquare signal in accordance with the absquare function of said first derivative signal, means including an adder for combining said absquare signal with at least said deviation signal to form a net control signal continuously variable over a given range, and motor operator means coupled to said adder for response to the net control signal and having means including an output member connected to said speed control element for correctively moving the latter in one direction or the other at a speed which is proportional to the control signal for a predetermined band of signal values substantially less than said given range and at maximum speed for all signal values above such band.

9. A governor for an engine or the like having a speed control element comprising, in combination, a deviation sensing device having means for producing a signal representative of the deviation of the speed from a control point, a first derivative device having means for producing a signal representative of the first derivative of the deviation, an absquaring device having means for producing an absquare signal in accordance with the absquare function of said first derivative signal, adder means connected to said devices for combining the output signals from said devices to form a continuously variable net control signal, and motor operator means linearly responsive to the net control signal but saturable by the latter when it exceeds predetermined values for correctively operating upon said speed control element to restore the speed to the control point, said deviation device and said first derivative device each including a gain changer for changing the output signals therefrom automatically in response to the magnitude of the signals in the respective devices.

10. A governor for an engine or the like having a speed control element comprising, in combination, a deviation sensing device coupled to said engine and having means for producing a signal representative of the deviation of the speed from a control point, a first derivative device coupled to said engine and having means for producing a signal representative of the first derivative of the deviation, an absquare device coupled to said engine and having means for producing an absquare signal in accordance with the absquare function of said first derivative signal, means for combining the signals from the devices to form a continuously variable net control signal, and motor operator means linearly responsive to the net control signal but saturable by the latter when it exceeds predetermined values for correctively operating upon said speed control element to restore the speed to the control point, said deviation device having means for decreasing the gain in response to low signal conditions therein and said first derivative device having means for increasing the gain in response to low signal conditions therein.

11. A governor for an engine or the like having a speed control element comprising, in combination, a deviation sensing device coupled to said engine and having means for producing a signal representative of the deviation of the speed from a control point, a first derivative device coupled to said engine and having means for producing a signal representative of the first derivative of the deviation, an absquare device coupled to said engine and having means for producing an absquare signal in accordance wth the absquare function of said first derivative signal, means for combining the signals from the devices to form a continuously variable net control signal, and motor operator means linearly responsive to the net control signal but saturable by the latter when it exceeds predetermined values for correctively operating upon said speed control element to restore the speed to the control point, at least one of said devices having gain changer means for changing the gain therein gradually from one value to another in response to a low signal condition in such device.

12. A governor for an engine or the like having a speed control element comprising, in combination, a deviation sensing device coupled to said engine and having means for producing a signal representative of the deviation of the speed from a control point, a first derivative device coupled to said engine and having means for producing a signal representative of the first derivative of the deviation, an absquare device coupled to said engine and having means for producing an absquare signal in accordance with the absquare function of the first derivative signal, means for algebraically adding the signals from the devices to form a continuously variable net control signal, and motor operator means linearly responsive to the net control signal but saturable by the latter when it exceeds predetermined values for correctively operating upon said speed control element to restore the speed to the control point, said deviation device and said first derivative device each having a gain changer arranged directly ahead of the adding means for varying the gain therein automatically in response to the signal in such channel reaching a predetermined low value while leaving the gain of the signal fed into the absquare device unchanged.

13. A governor for an engine or the like having a speed control element comprising, in combination, a deviation sensing device coupled to said engine and having means for producing a signal representative of the deviation of the speed from a control point, a first derivative device coupled to said engine and having means for producing a signal representative of the first derivative of the deviation, an absquare device coupled to the first derivative device and having means for producing an absquare signal in accordance with the absquare function of the first derivative signal, means for combining the signals from the devices to form a continuously variable net control signal, said deviation device and said first derivative device having means for changing the gain therein automatically in response to low signal conditions in the respective devices, means for adjusting the magnitudes of the gain and the breakpoints at which change of gain occurs separately for each device, and motor operator means linearly responsive to the net control signal but saturable by the latter when it exceeds predetermined magnitudes for correctively operating upon said speed control element to restore the speed to the control point.

14. A governor for an engine or the like having a speed control element comprising, in combination, a deviation channel having means coupled to said engine for producing a signal representative of the deviation of the speed from a control point, the first derivative channel having means coupled to said engine for producing a signal representative of the first derivative of the deviation, an absquare channel having means coupled to said first derivative means for producing an absquare signal in accordance with the absquare function of said first derivative signal, means for combining the signal from the absquare channel with the signal from the deviation channel to form a continuously variable net control signal, and motor operator means linearly responsive to the net control signal but saturable by the latter when it exceeds predetermined magnitudes for correctively operating upon said speed control element to restore the speed to the control point, at least one of said channels having means for effectively changing the gain of the channel from a value appropriate for high signals to a value appropriate for low signals, and means including an adjustment element for causing the change of gain to occur when the signal drops to a predetermined magnitude.

15. A governor for an engine or the like having a speed control element comprising, in combination, a deviation channel having means coupled to the engine for producing a signal representative of the deviation of the speed from a control point, a first derivative channel having means coupled to the engine for producing a signal representative of the first derivative of the deviation, an absquare channel having means coupled to the first derivative channel for producing an absquare signal in accordance with the absquare function of the first derivative signal, means including a signal adder for combining the signal from the absquare channel with at least the signal from the deviation channel to form a continuously variable net control signal, motor operator means having a pilot element connected to respond to said net control signal and having an output member for correctively moving said speed control element to restore the speed to the control point in proportion to the degree of response of the pilot element, and means interposed between said signal adder and said pilot element for limiting the maximum value of the net control signal applied to the latter.

16. A governor for an engine or the like having a speed control element comprising, in combination, a deviation channel having means coupled to said engine for producing a signal representative of the deviation of the speed from a control point, a first derivative channel having means coupled to said engine for producing a signal representative of the first derivative of the deviation, an absquare channel having means for producing an absquare signal in accordance with the absquare function of a signal representing the first derivative, means including a signal adder for combining the signal from the absquare channel with at least the signal from the deviation channel to form a continuously variable net control signal, motor operator means having a pilot element connected to respond to said net control signal and having an output member connected to said speed control element and means interposed between said adder and the pilot element of said motor operator for limiting the maximum value of the net control signal applied to said pilot element to a value which is sufficient to cause substantially full speed movement of the output member.

17. A governor for an engine or the like having a speed control element comprising, in combination, a deviation channel having means coupled to the engine for producing a signal representative of the deviation of the speed from a control point, a first derivative channel having means coupled to the engine for producing a signal representative of the first derivative of the deviation, an absquare channel having means for producing an absquare signal in accordance with the absquare function of the first derivative signal, means including a signal adder for combining the signal from the absquare channel with at least the signal from the deviation channel to form a continuously variable net control signal, and a motor operator having an output member connected to said speed control element and having means including a pilot member proportionately shiftable between fixed limits in response to said net control signal for causing corrective movement of the output member at a speed which is substantially proportional to the magnitude of the net control signal, and means for limiting the maximum value of the net control signal applied to said pilot member to a value which restricts the latter to movement within its fixed limits.

18. A governor for an engine or the like having a speed control element comprising, in combination, a deviation channel having means coupled to the engine for producing a signal representative of the deviation of the speed from a control point, derivative channels having means coupled to the engine for producing signals representative of successive derivatives of the deviation, an absquare channel having means for producing an absquare signal which is proportional to the absquare of the sum of said successive derivatives, means for combining the signals from said channels to form a continuously variable net control signal, and motor operator means linearly responsive to the net control signal but saturable by the latter when it exceeds predetermined values for correctively operating upon said speed control element to restore the speed to the control point.

19. A governor for an engine or the like having a speed control element comprising, in combination, a speed-sensing element coupled to the engine, a deviation channel coupled to said speed-sensing element and having means for producing a signal representative of the deviation of the speed from the control point, a first derivative channel having means coupled to the engine for producing a signal representative of the first derivative of the deviation, an absquare channel coupled to the engine and having an absquaring device for producing a signal proportional to the absquare of the first derivative signal, means including an adder coupled to said channels for combining the signals therefrom to form a net control signal which varies continuously as a linear and non-linear function of the deviation, and motor operator means connected to the adder and proportionally responsive to said net control signal but saturable by the latter when it exceeds predetermined values for correctively operating upon the speed control element to restore the speed of the engine to the control point.

20. In an automatic controller for maintaining a variable condition at a desired reference value, the combination comprising a deviation channel having measuring means for producing a first signal indicative of the deviation of the variable condition from the desired value, a second channel having means for producing a second signal indicative of the absquare of the first derivative of the deviation of the variable condition from the desired value, means for algebraically combining said first and second signals to form a net control signal, continuously variable over a given range; and power means, coupled to receive said net control signal and linearly responsive thereto but saturable thereby when such signal exceeds predetermined values substantially less than the limits of said range, for correctively adjusting said variable condition.

21. In an automatic controller for maintaining a variable condition at a desired reference value, the combination of power means for changing the variable condition, said power means having an output which varies linearly as an input signal supplied thereto varies over a predetermined band and which saturates at maximum values as the input signal exceeds said band, a deviation detecting channel having means for producing a first signal indicative of the deviation of the variable condition from the desired value, a first derivative channel having means for producing a second signal indicative of the first derivative of the deviation, an absquare channel having means for producing a third signal indicative of the absquare of the first derivative of the deviation, means for combining said first, second, and third signals to form a net control signal which varies continuously with a given range, said predetermined range being substantially greater than said predetermined band, and means for supplying said net control signal to said power means as the input signal for the latter.

22. In an automatic controller for maintaining a variable condition at a desired reference value, the combination comprising a deviation channel including measuring means for producing a first signal varying proportionally with the deviation of the variable condition from the desired value, a first derivative channel including means for producing a second signal varying proportionally with the first derivative of said deviation, an absquare channel including means for producing a third signal varying proportionally with the absquare of the sum of the first and second derivatives of said deviation, means for algebraically combining said first, second, and third signals to form a continuously varying composite control signal, and power means linearly responsive to said control signal but saturable thereby when it exceeds predetermined values for correctively restoring said condition to the desired value.

23. In an automatic controller for maintaining a variable condition at a desired reference value, the combination comprising energy-responsive means for producing changes in the variable condition, a deviation channel having measuring means for producing a first signal varying proportionally with the deviation of the variable condition from the desired value, a first derivative channel having means for producing a second signal varying proportionally with the first derivative of said deviation, a second derivative channel having means for producing a third signal varying proportionally with the second derivative of said deviation, an absquare channel for producing a fourth signal varying proportionally with the absquare of the sum of the first and second derivatives of said deviation, means for algebraically combining said first, second, third, and fourth signals to form a continuously varying composite control signal, and power means linearly resopnsive to said control signal but saturable thereby when said signal exceeds a predetermined value for correctively restoring said variable condition to the desired value.

24. In a servo control system for reducing a difference in status between a controlled element and a controlling element, said system including sensing means producing signals respectively representative of the status of said controlled and controlling elements, the combination of: error-signal means connected to said sensing means producing an error signal substantially equal to said difference in status; computer means producing an output which is a continuous non-linear differential function of its input; means for supplying said error signal as the input to said computer means; a power system producing an output that is continuously variable in magnitude between two predetermined limits; means connecting the output of said computer means to said power system for controlling said power system so that said output of said power system can be varied from one of said limits through a proportional region to the other of said limits in response to corresponding variations in said output of said computer means; and means connecting said output of said power system to said controlled element.

25. A servo control system as defined in claim 24 in which said computer means is constituted of passive components.

26. A servo control system as defined in claim 24 in which said computer means includes linear and non-linear computers connected serially between said error-signal means and said power system.

27. A predictor type servo control system for reducing to zero in substantially a minimum of time the status difference between controlled and controlling elements, said control system including: a measuring means for determining the instantaneous status difference between said elements; a controller having an input connected to said measuring means to receive an error signal representing said status difference, said controller including computer means producing an output which is a nonlinear differential function of such error signal; a power means having an output adapted to be operatively connected to said controlled element, said output being continuously variable in magnitude between two predetermined limits; and means connecting the output of said computer means to said power means for controlling said power means so that said output of said power means can be varied from one of said limits through a proportional region to the other of said limits in response to corresponding variations in said output of said computer means.

28. A predictor type servo control system as defined in claim 27 in which said computer means receives information concerning the instantaneous status difference from said measuring means and in which said computer means includes means for computing at least the first differential of said status difference and for varying its output in accordance therewith.

29. In a servo control for a system having a controlled element, a controlling element and measuring means for determining a difference in status between said controlled and controlling elements, the combination of: a first computer means having an input and an output, said output being a linear integro-differential function of said input; means connecting said measuring means to said input of said first computer means; a second computer means having an input and an output, said output of said second computer means being a non-linear function of said input thereof; means connecting said output of said first computer means to said input of said second computer means; a power system producing an output that is continuously variable in magnitude between two predetermined limits; means connecting said output of said second computer means to said power system for controlling said power system so that said output of said power system can be varied from one of said limits through a proportional region to the other of said limits in response to corresponding variations in said output of said second computer means; and means connecting said output of said power system to said controlled element.

30. In a third or higher order servo control system for reducing a difference in status between controlled and controlling element in a minimum of time, including sensing means producing signals representative of the status of said controlled and controlling elements, the combination of: a power system having an input and producing an output which is operable at first and second predetermined outputs and is variable therebetween respectively in response to first limit, second limit and intermediate variable-magnitude signals supplied to said input of said power system; means for operatively connecting said power system to said controlled element to control the latter; computer means comprising a composite network producing an output which is a non-linear differential function of said difference, said composite network comprising means responsive to said difference for sequentially producing said first limit, second limit and intermediate signals supplied to said input of said power system; and means for supplying to said computer signals representing said difference in status.

31. In a third or higher order servo control system for reducing a difference in status between controlled and controlling elements in a minimum of time, including sensing means producing signals representative of the status of said controlled and controlling elements, the combination of: a power system producing an output continuously variable within two predetermined limits; means for operatively connecting said power system to said controlled element to control the latter; computer means producing an output which is a continuous non-linear integro-differential function of said difference; means for connecting said output of said computer in controlling relationship to the input of said power system so that said output of said power system can be varied from one of said limits through a proportional region to the other of said limits in response to corresponding variations in said output of said computer; and means coupling each of said sensing means to said computer means.

32. A servo control system as defined in claim 31 in which said computer means is constituted of passive components.

33. A servo control system as defined in claim 31 in which said computer means includes a first branch producing a non-linear integro-differential function of said difference in status and a second branch producing a linear integro-differential function of said difference in status.

34. A servo control system as defined in claim 33 including an algebraic combining means, and connecting means coupling the output of said first branch and the output of said second branch respectively to said algebraic combining means, the output of said algebraic combining means being connected to said input of said power system.

35. A servo control system as defined in claim 31 in which said computer means includes two computers serially connected to said input of said power system, with the first of said computers producing a linear integro-differential function of said difference and with the second of said computers connected intermediate the first of said computers and said power system and producing a non-linear function of said linear integro-differential function.

36. In a servo control for a system having a controlled element, a controlling element and measuring means for determining a difference in status between said controlled and controlling elements, the system being capable of being represented by an $n$th order differential equation, the combination of: a first computer means having an input and an output, said output being a linear integro-differential function of said input; means connecting said measuring means to said input of said first computer means; a second computer means having an input and an output, said output of said second computer means being a non-linear function of said input thereof, said second computer means being instrumented in accordance with a second order differential equation derived from said $n$th order differential equation, said first computer means being instrumented in accordance with an $n-2$ order differential equation corresponding to the difference between said $n$th order differential equation and said second order differential equation; means connecting said output of said first computer means to said input of said second computer means; a power system producing an output that is continuously variable in magnitude between two predetermined limits; means connecting said ouput of said second computer means to said power system; and means connecting said output of said power system to said controlled element.

37. In a servo control system for reducing a difference in status between controlled and controlling elements in a minimum of time, the system being capable of being represented by an $n$th order differential equation, $n$ being greater than 2, and including sensing means producing signals representative of the status of said controlled and controlling elements, the combination of: a power system producing an output continuously variable within two predetermined limits; means for operatively connecting said power system to said controlled element to control the latter; computer means producing an output which is a continuous nonlinear integro-differential function of said difference, said computer means including a non-linear network instrumented in accordance with a second order differential equation derived from said $n$th order differential equation; means for connecting said output of said computer means in controlling relationship to the input of said power system; and means coupling each of said sensing means to said computer means.

38. The method of controlling a variable condition to maintain it at a desired reference value comprising the steps of continuously determining the deviation of the condition from the desired value, continuously determining the rate of change of said deviation, continuously determining the absquare of said rate of change, deriving from said determinations a control signal which varies continuously as a non-linear function of said deviation and said absquare over a given range of magnitudes, correctively adjusting said condition at a maximum, limited rate when said control signal exceeds predetermined values which are substantially less than said given range, and correctively adjusting said condition at a rate linearly proportional to said control signal when the latter is less than said predetermined values.

References Cited in the file of this patent

UNITED STATES PATENTS

| | | |
|---|---|---|
| 2,428,702 | Elliot | Oct. 7, 1947 |
| 2,494,876 | Hornfeck | Jan. 17, 1950 |
| 2,506,266 | Cage | May 2, 1950 |
| 2,593,950 | Williams | Apr. 22, 1952 |
| 2,663,832 | McDonald | Dec. 22, 1953 |
| 2,674,708 | Husted | Apr. 6, 1954 |
| 2,710,933 | Dion | June 14, 1955 |